(12) United States Patent
Kim et al.

(10) Patent No.: US 9,306,399 B2
(45) Date of Patent: Apr. 5, 2016

(54) WIRELESS POWER TRANSMISSION AND CHARGING SYSTEM, AND RESONANCE FREQUENCY CONTROL METHOD OF WIRELESS POWER TRANSMISSION AND CHARGING SYSTEM

(75) Inventors: Nam Yun Kim, Seoul (KR); Sang Wook Kwon, Seongnam-si (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 13/464,568

(22) Filed: May 4, 2012

(65) Prior Publication Data

US 2012/0286726 A1  Nov. 15, 2012

(30) Foreign Application Priority Data

May 12, 2011  (KR) .................. 10-2011-0044679

(51) Int. Cl.
| | |
|---|---|
| *H02J 7/14* | (2006.01) |
| *H02J 5/00* | (2006.01) |
| *H02J 7/02* | (2006.01) |
| *H04B 5/00* | (2006.01) |
| *B60L 11/18* | (2006.01) |

(52) U.S. Cl.
CPC .............. *H02J 5/005* (2013.01); *B60L 11/182* (2013.01); *B60L 11/1833* (2013.01); *H02J 7/025* (2013.01); *H04B 5/0037* (2013.01); *H04B 5/0081* (2013.01); *B60L 2210/10* (2013.01); *B60L 2210/30* (2013.01); *B60L 2210/40* (2013.01); *Y02B 60/50* (2013.01); *Y02T 10/7005* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(58) Field of Classification Search
CPC ................................ H02J 7/025; H01F 38/14
USPC .......................................................... 320/108
See application file for complete search history.

(56) References Cited

U.S. PATENT DOCUMENTS

| | | | | |
|---|---|---|---|---|
| 2008/0079392 | A1* | 4/2008 | Baarman et al. | 320/108 |
| 2010/0231340 | A1* | 9/2010 | Fiorello et al. | 336/92 |
| 2011/0084654 | A1* | 4/2011 | Julstrom et al. | 320/108 |
| 2011/0285356 | A1* | 11/2011 | Maluf et al. | 320/139 |
| 2012/0306433 | A1* | 12/2012 | Kim et al. | 320/106 |
| 2014/0184150 | A1* | 7/2014 | Walley | 320/108 |
| 2014/0375257 | A1* | 12/2014 | Akiyama et al. | 320/108 |

FOREIGN PATENT DOCUMENTS

| | | | |
|---|---|---|---|
| JP | 2008-206233 | A | 9/2008 |
| JP | 2009-131039 | A | 6/2009 |

(Continued)

*Primary Examiner* — Suresh Memula
(74) *Attorney, Agent, or Firm* — NSIP Law

(57) ABSTRACT

A wireless power transmission and charging system, and a communication method of the wireless power transmission and charging system are provided. In one embodiment, a resonance frequency control method of a wireless power transmitter may include: generating communication power used for communication in a plurality of target devices using a reference resonance frequency; transmitting communication power to the plurality of target devices; transmitting charging power to the plurality of target devices; and adjusting the reference resonance frequency based on a reflected wave of the charging power, the amount of power received by one or more of the target devices, the amount of the charging power, the transmission efficiency of the charging power, or any combination thereof.

21 Claims, 17 Drawing Sheets

(56) References Cited

FOREIGN PATENT DOCUMENTS

| | | | |
|---|---|---|---|
| JP | 2009-213294 A | 9/2009 | |
| JP | 2009-213295 A | 9/2009 | |
| JP | 2010-063245 A | 3/2010 | |
| KR | 10-2010-0112034 A | 10/2010 | |
| KR | 10-2011-0037732 A | 4/2011 | |

* cited by examiner

WIRELESS POWER TRANSMISSION AND CHARGING SYSTEM, AND RESONANCE FREQUENCY CONTROL METHOD OF WIRELESS POWER TRANSMISSION AND CHARGING SYSTEM

CROSS-REFERENCE TO RELATED APPLICATION(S)

This application claims the benefit under 35 U.S.C. §119(a) of Korean Patent Application No. 10-2011-0044679, filed on May 12, 2011, in the Korean Intellectual Property Office, the entire disclosure of which is incorporated herein by reference for all purposes.

BACKGROUND

1. Field

The following disclosure relates to wireless power transmission and charging.

2. Description of Related Art

Wireless power refers to energy that is transferred from a wireless power transmitter to a wireless power receiver, for example, using a magnetic coupling. The wireless power receiver may be used to charge a battery using the received energy. A typical wireless power transmission and charging system includes a source device to wirelessly transmit power and a target device to wirelessly receive the power. The source device may be referred to as a wireless power transmitter, and the target device may be referred to as a wireless power receiver.

The source device includes a source resonator, and the target device includes a target resonator, with a magnetic coupling or resonance coupling provided between the source resonator and the target resonator. The source device and the target device may perform communication to transmit and receive control information and state information.

SUMMARY

According to a general aspect, a resonance frequency control method of a wireless power transmitter may include: generating communication power used for communication in a plurality of target devices using a reference resonance frequency; transmitting communication power to the plurality of target devices; transmitting charging power to the plurality of target devices; and adjusting the reference resonance frequency based on a reflected wave of the charging power, the amount of power received by one or more of the target devices, the amount of the charging power, the transmission efficiency of the charging power, or any combination thereof.

The generating of the communication power may include converting direct current (DC) voltage supplied to a power amplifier to alternating current (AC) voltage using the reference resonance frequency.

The method may further include: transmitting a wake-up request message to the plurality of target devices; receiving, from one or more of the plurality of target devices, response messages corresponding to the wake-up request message; and detecting the number target devices based on the received response messages.

The method may further include: generating the charging power by adjusting a signal level of the DC voltage supplied to the power amplifier based on the number of target devices.

One or more of the response messages corresponding to the wake-up request message may include a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

The generating of the charging power may include: determining the signal level of the DC voltage supplied to the power amplifier based on the product type of the corresponding target device, the manufacturer information of the corresponding target device, the product model name of the corresponding target device, the battery type of the corresponding target device, the charging scheme of the corresponding target device, the impedance value of the load of the corresponding target device, the information about the characteristic of the target resonator of the corresponding target device, the information about the used frequency band of the corresponding target device, the amount of the power to be used for the corresponding target device, the intrinsic identifier of the corresponding target device, the product version information or standards information of the corresponding target device, or any combination thereof.

The adjusting of the reference resonance frequency may include: calculating a voltage standing wave ratio (VSWR) based on the voltage level of the reflected wave, and the level of an output voltage and a level of an output current of a source resonator; determining a tracking frequency having the highest power transmission efficiency among N predetermined tracking frequencies when the VSWR is less than a predetermined reference value; and generating charging power using the tracking frequency having the highest power transmission efficiency.

The determining of the tracking frequency having the highest power transmission efficiency may include: performing the following operations a) through g) for one or more of the N predetermined tracking frequencies, a) selecting one of the N predetermined tracking frequencies based on a predetermined frequency selection scheme; b) changing the reference resonance frequency to the selected tracking frequency; c)transmitting the charging power; d) transmitting, to the plurality of target devices, a command to request an input voltage value and an input current value of a target device, or a command to request a DC/DC output voltage value and a DC/DC output current value of the target device; e) receiving, from each of the plurality of target devices, an input voltage value and an input current value of a rectification unit, or the DC/DC output voltage value and the DC/DC output current value; f) calculating an amount of power received by each of the plurality of target devices based on the input voltage value and the input current value, or the DC/DC output voltage value and the DC/DC output current value; and g) calculating the transmission efficiency of the charging power based on an output voltage level and an output current level of the source resonator, and the amount of the power received by each of the plurality of target devices.

The predetermined frequency selection scheme in the operation a) may correspond to a scheme of selecting frequencies in a sequential order, starting from a low frequency to a high frequency among the N predetermined tracking frequencies, or a scheme of selecting frequencies in a sequential order, starting from a high frequency to a low frequency among the N predetermined tracking frequencies.

The predetermined frequency selection scheme in the operation a) may correspond to a scheme of sequentially selecting M predetermined tracking frequencies from the N predetermined tracking frequencies, primarily performing the operations b) through g) continuously for one or more of the M predetermined tracking frequencies, and secondarily performing the operations b) through g) continuously for each tracking frequency, excluding the M predetermined tracking frequencies from the N predetermined tracking frequencies, M being less than N.

The predetermined frequency selection scheme in the operation a) may correspond to a scheme of classifying the N predetermined tracking frequencies into M groups, selecting one of the M groups based on the number of the plurality of target devices, and sequentially selecting tracking frequencies included in the selected group, M being less than N.

According to another general aspect, a wireless power transmitter may include: a power converter configured to generate communication power used for communication, charging power used for charging in a plurality of target devices, or both using a reference resonance frequency; a source resonator configured to transmit, to the plurality of target devices, the communication power, the charging power, or both; and a control/communication unit configured to adjust the reference resonance frequency based on a reflected wave of the charging power, the amount of power received by one or more of the plurality of target devices, the amount of the charging power, the transmission efficiency of the charging power, or any combination thereof.

The power converter may be configured to generate the communication power, the charging power, or both by converting direct current (DC) voltage supplied to a power amplifier to alternating current (AC) voltage using the reference resonance frequency.

The control/communication unit may be configured to adjust the signal level of the DC voltage supplied to the power amplifier based on the number of the plurality of target devices.

The control/communication unit may be configured to determine the signal level of the DC voltage to be supplied to the power amplifier, based on a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

The control/communication unit may be configured to calculate a voltage standing wave ratio (VSWR) based on a voltage level of the reflected wave, and a level of an output voltage and a level of an output current of the source resonator, to calculate the power transmission efficiency for one or more of N predetermined tracking frequencies when the VSWR is less than a predetermined value, to determine a tracking frequency having the highest power transmission efficiency, among the N predetermined tracking frequencies, and to change the reference resonance frequency to the tracking frequency having the highest power transmission efficiency.

The control/communication unit may be configured to perform the following operations a) through g) for one or more of the N predetermined tracking frequencies in order to determine the tracking frequency having the highest power transmission efficiency, a) selecting one of the N predetermined tracking frequencies based on a predetermined frequency selection scheme; b) changing the reference resonance frequency to the selected tracking frequency; c) transmitting the charging power; d) transmitting, to the plurality of target devices, a command to request an input voltage value and an input current value of a target device, or a command to request a DC/DC output voltage value and a DC/DC output current value of the target device; e) receiving, from each of the plurality of target devices, an input voltage value and an input current value of a rectification unit, or the DC/DC output voltage value and the DC/DC output current value; f) calculating an amount of power received by each of the plurality of target devices, based on the input voltage value and the input current value, or the DC/DC output voltage value and the DC/DC output current value; and g) calculating a transmission efficiency of the charging power, based on an output voltage level and an output current level of the source resonator, and the amount of the power received by each of the plurality of target devices.

The predetermined frequency selection scheme in the operation a) may correspond to a scheme of selecting frequencies in a sequential order, starting from a low frequency to a high frequency among the N predetermined tracking frequencies, or a scheme of selecting frequencies in a sequential order, starting from a high frequency to a low frequency among the N predetermined tracking frequencies.

The predetermined frequency selection scheme in the operation a) may correspond to a scheme of sequentially selecting M predetermined tracking frequencies from the N predetermined tracking frequencies, primarily performing the operations b) through g) continuously for each of the M predetermined tracking frequencies, and secondarily performing the operations b) through g) continuously for each tracking frequency, excluding the M predetermined tracking frequencies from the N predetermined tracking frequencies, M being less than N.

The predetermined frequency selection scheme in the operation a) may correspond to a scheme of classifying the N predetermined tracking frequencies into M groups, selecting one of the M groups based on the number of the plurality of target devices, and sequentially selecting tracking frequencies included in the selected group, M being less than N.

According to yet another general aspect, a wireless power receiver may include: a target resonator configured to receive power from a source resonator; and a control/communication unit configured to: detect the amount of power received by the target resonator, and transmit, to the wireless power transmitter, information about the amount of the power received by the target resonator.

The control/communication unit may be configured to receive a wake-up request message from the wireless power transmitter.

The wireless power receiver may further include: a rectification unit configured to generate a direct current (DC) signal by rectifying an alternating current (AC) signal of the power received by the target resonator; and a DC/DC converter configured to supply voltage of a predetermined level to a load by adjusting a level of the DC signal.

The control/communication unit may be configured to transmit, to the wireless power transmitter, a response message comprising a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

The information about the amount of the power received by the target resonator may correspond to an input voltage value and an input current value of the rectification unit, an output voltage value and an output current value of the rectification unit, or a DC/DC output voltage value and a DC/DC output current value.

According to a further general aspect, a power receiving method of a wireless power receiver may include: receiving communication power that is generated using a reference resonance frequency, from a wireless power transmitter; receiving first charging power from the wireless power transmitter; and receiving second charging power that is generated using an adjusted reference resonance frequency after the reference resonance frequency has been adjusted in the wireless power transmitter.

The method may further include: receiving a wake-up request message from the wireless power transmitter; and transmitting, to the wireless power transmitter, a response message corresponding to the wake-up request message.

The first charging power may be generated by adjusting a signal level of a direct current (DC) voltage to be supplied to a power amplifier of the wireless power transmitter.

The reference resonance frequency may be adjusted based on a reflected wave of the first charging power, an amount of the first charging power, or a transmission efficiency of the first charging power.

The response message corresponding to the wake-up request message may include: a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, or product version information or standards information of the corresponding target device.

The adjusted reference resonance frequency may correspond to a tracking frequency having the highest power transmission efficiency, among N predetermined tracking frequencies.

The tracking frequency having the highest power transmission efficiency is determined by performing the following operations a) through c) for one or more of the N predetermined tracking frequencies, a) receiving the second charging power; b) receiving, from the wireless power transmitter, a command to request an input voltage value and an input current value of a target device, or a command to request a DC/DC output voltage value and a DC/DC output current value of the target device; and c) transmitting, to the wireless power transmitter, an input voltage value and an input current value of a rectification unit, or the DC/DC output voltage value and the DC/DC output current value.

According to an even further general aspect, a resonance frequency control method of a wireless power transmitter may include: adjusting a reference resonance frequency of the wireless power transmitter based on a reflected wave of a charging power, the amount of power received by one or more of target devices, the amount of the charging power, the transmission efficiency of the charging power, or any combination thereof.

Other features and aspects will be apparent from the following detailed description, the drawings, and the claims.

Figure 1:
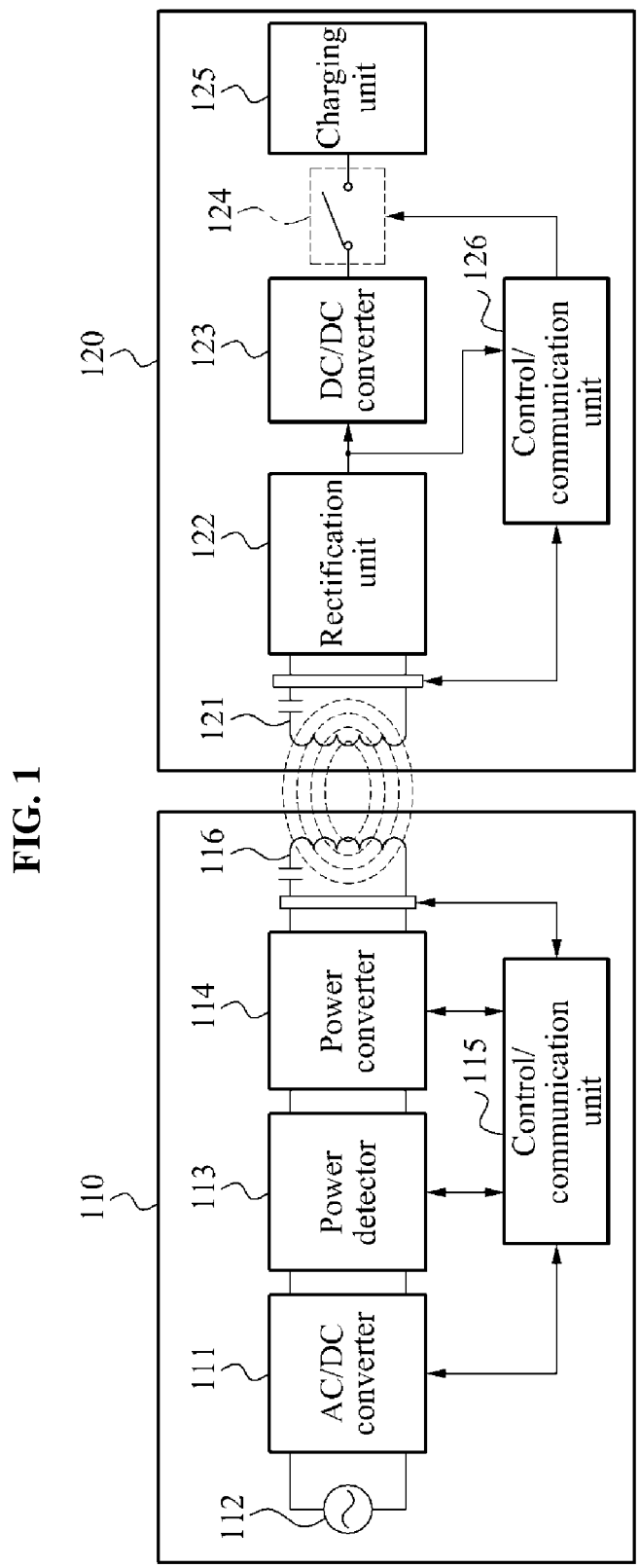
FIG. 1 is a diagram illustrating a wireless power transmission and charging system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission and charging system.

As shown, the wireless power transmission and charging system includes a source device 110, and a target device 120.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a charging unit 125, and a control/communication unit 126.

The AC/DC converter 111 may be configured to generate a DC voltage, for example, by rectifying an AC voltage (e.g., in a band of tens of hertz (Hz)) output from a power supply 112. The AC/DC converter 111 may be configured to output a DC voltage of a predetermined level, or may adjust an output level of a DC voltage based on the control of the control/communication unit 115.

The power detector 113 may be configured to detect an output current and an output voltage of the AC/DC converter 111, and may transfer, to the control/communication unit 115, information on the detected current and the detected voltage. Additionally, the power detector 113 may detect an input current and an input voltage of the power converter 114.

The power converter 114 may generate power by converting DC voltage of a predetermined level to AC voltage, using a switching pulse signal (e.g., in a band of a few megahertz (MHz) to tens of MHz). For example, the power converter 114 may generate a communication power used for communication or a charging power used for charging in a plurality of target devices by converting DC voltage supplied to a power amplifier to AC voltage using a reference resonance frequency $F_{Ref}$. The communication power and the charging power will be described later with reference to FIG. 4.

The reference resonance frequency may refer to a resonance frequency used by the source device 110. Also, the tracking frequency may refer to a resonance frequency adjusted based on a predetermined scheme.

The control/communication unit 115 may detect a reflected wave of the communication power and/or a reflected wave of the charging power, and may detect mismatching between the target resonator 121 and the source resonator 116 based on the detected reflected wave. The control/communication unit 115 may detect the mismatching by detecting an envelope of the reflected wave, or by detecting an amount of power of the reflected wave. The control/communication unit 115 may calculate a voltage standing wave ratio (VSWR), based on a voltage level of the reflected wave, and a level of an output voltage of the source resonator 116 or the power converter 114. When the VSWR is less than a predetermined value, the control/communication unit 115 may determine that the mismatching is detected. For example, the control/communication unit 115 may calculate a power transmission efficiency of each of N predetermined tracking frequencies, determine a tracking frequency $F_{Best}$ having the best or highest power transmission efficiency, among the N predetermined tracking frequencies, and change the reference resonance frequency $F_{Ref}$ to the tracking frequency $F_{Best}$.

Also, the control/communication unit 115 may control a frequency of a switching pulse signal. Under the control of the control/communication unit 115, the frequency of the switching pulse signal may be determined. By controlling the power converter 114, the control/communication unit 115 may generate a modulation signal to be transmitted to the target device 120. In other words, the control/communication unit 115 may transmit various messages to the target device 120 via in-band communications. Additionally, the control/communication unit 115 may detect a reflected wave, and may demodulate a signal received from the target device 120 through an envelope of the reflected wave.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The control/communication unit 115 may generate a modulation signal for in-band communication, using various schemes. To generate a modulation signal, the control/communication unit 115 may turn on or off a switching pulse signal, or may perform delta-sigma modulation. Additionally, the control/communication unit 115 may generate a pulse-width modulation (PWM) signal with a predetermined envelope.

The control/communication unit 115 may perform out-band communication using a communication channel. The control/communication unit 115 may include a communication module, such as one configured to process ZigBee, Wi-Fi, Wi-Max, Bluetooth, and the like communication protocols. The control/communication unit 115 may transmit or receive data to or from the target device 120 via the out-band communication.

The source resonator 116 may transfer electromagnetic energy to the target resonator 121. For example, the source resonator 116 may transfer, to the target device 120, the communication power, the charging power, or both using a magnetic coupling with the target resonator 121.

The target resonator 121 may receive the electromagnetic energy from the source resonator 116. For example, the target resonator 121 may receive, from the source device 110, the communication power or the charging power using a magnetic coupling with the source resonator 116. Additionally, the target resonator 121 may receive various messages from the source device 110 via the in-band communication.

The rectification unit 122 may generate a DC voltage by rectifying an AC voltage. The rectification unit 122 may rectify an AC voltage received by the target resonator 121.

The DC/DC converter 123 may adjust a level of the DC voltage output from the rectification unit 122, based on a capacity of the charging unit 125. For example, the DC/DC converter 123 may adjust, to 3 to 10 V, the level of the DC voltage output from the rectification unit 122.

The switch unit 124 may be turned ON or OFF, under the control of the control/communication unit 126. When the switch unit 124 is turned OFF, the control/communication unit 115 of the source device 110 may detect a reflected wave. And, when the switch unit 124 is turned OFF, the magnetic coupling between the source resonator 116 and the target resonator 121 may be eliminated.

The charging unit 125 may include at least one battery. The charging unit 125 may charge the at least one battery using a DC voltage output from the DC/DC converter 123.

The control/communication unit 126 may perform in-band communication for transmitting or receiving data using a resonance frequency. The control/communication unit 126 may demodulate a received signal by detecting a signal between the target resonator 121 and the rectification unit 122, or by detecting an output signal of the rectification unit 122. For instance, the control/communication unit 126 may demodulate a message received via the in-band communication.

Additionally, the control/communication unit 126 may adjust an impedance of the target resonator 121, to modulate a signal to be transmitted to the source device 110. The control/communication unit 126 may modulate the signal to be transmitted to the source device 110, by turning ON or OFF the switch unit 124. For example, the control/communication unit 126 may increase the impedance of the target resonator 121, so that a reflected wave may be detected by the control/communication unit 115 of the source device 110. Depending on whether the reflected wave is detected, the control/communication unit 115 of the source device 110 may detect a binary number (e.g., "0" or "1").

The control/communication unit 126 may transmit, to the wireless power transmitter, a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

The control/communication unit 126 may also perform an out-band communication using a communication channel. The control/communication unit 126 may include a communication module, such as one configured to process ZigBee, Wi-Fi, Wi-Max, Bluetooth, and/or the like communications. The control/communication unit 126 may transmit or receive data to or from the source device 110 via the out-band communication.

The control/communication unit 126 may receive a wake-up request message from the wireless power transmitter, detect an amount of power received by the target resonator, and transmit, to the wireless power transmitter, information about the amount of the power received by the target resonator. The information about the amount of the power received by the target resonator may correspond to an input voltage value and an input current value of the rectification unit 122, an output voltage value and an output current value of the rectification unit 122, or an output voltage value and an output current value of the DC/DC converter 123.

The control/communication unit 115 may set a resonance bandwidth of the source resonator 116. Based on the set resonance bandwidth of the source resonator 116, a Q-factor (Qs) of the source 116 may be determined.

The control/communication unit 126 may set a resonance bandwidth of the target resonator 116. Based on the set resonance bandwidth of the target resonator 116, a Q-factor of the target resonator 121 may be determined. For instance, the resonance bandwidth of the source resonator 116 may be wider or narrower than the resonance bandwidth of the target resonator 121. By using communications, the source device 110 and the target device 120 may share information regarding each of the resonance bandwidths of the source resonator 116 and the target resonator 121. When a power higher than a reference value is requested from the target device 120, the Q-factor (Qs) of the source resonator 116 may be set to a value greater than 100. When a power lower than the reference value is requested from the target device 120, the Q-factor (Qs) of the source resonator 116 may be set to a value less than 100.

In a resonance-based wireless power transmission, a resonance bandwidth may be an importance factor. When Qt indicates a Q-factor based on a change in a distance between the source resonator 116 and the target resonator 121, a change in resonance impedance, impedance-mismatching, a reflected signal, and the like, Qt may be in inverse proportion to a resonance bandwidth, as given in Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_o$ denotes a center frequency, $\Delta f$ denotes a bandwidth, $\Gamma_{S,D}$ denotes reflection loss between resonators, $BW_S$ denotes a resonance bandwidth of the source resonator 116, and $BW_D$ denotes a resonance bandwidth of the target resonator 121.

In a wireless power transmission, an efficiency U of the wireless power transmission may be given by Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad \text{[Equation 2]}$$

In Equation 2, K denotes a coupling coefficient regarding energy coupling between the source resonator 116 and the target resonator 121, $\Gamma_S$ denotes a reflection coefficient of the source resonator 116, $\Gamma_D$ denotes a reflection coefficient of the target resonator 121, $\omega_0$ denotes a resonance frequency, M denotes a mutual inductance between the source resonator 116 and the target resonator 121, $R_S$ denotes an impedance of the source resonator 116, $R_D$ denotes an impedance of the target resonator 121, $Q_S$ denotes a Q-factor of the source resonator 116, $Q_D$ denotes a Q-factor of the target resonator 121, and $Q_K$ denotes a Q-factor regarding energy coupling between the source resonator 116 and the target resonator 121.

Referring to Equation 2, the Q-factor may be highly associated with an efficiency of the wireless power transmission.

Accordingly, the Q-factor may be set to a great value in order to increase the efficiency of the wireless power transmission. When $Q_S$ and $Q_D$ are respectively set to a significantly great value, the efficiency of the wireless power transmission may be reduced based on a change in the coupling coefficient K regarding the energy coupling, a change in a distance between the source resonator 116 and the target resonator 121, a change in a resonance impedance, impedance mismatching, and the like.

When each of the resonance bandwidths of the source resonator 116 and the target resonator 121 is set to be too narrow in order to increase the efficiency of the wireless power transmission, the impedance mismatching and the like may easily occur due to insignificant external influences. In consideration of the impedance mismatching, Equation 1 may be expressed by Equation 3.

$$\frac{\Delta f}{f_0} = \frac{\sqrt{VSWR} - 1}{Qt\sqrt{VSWR}} \qquad \text{[Equation 3]}$$

When the resonance bandwidth between the source resonator 116 and the target resonator 121, or a bandwidth of a impedance-matching frequency is maintained to be unbalanced, the efficiency of the wireless power transmission may be reduced based on a change in the coupling coefficient K, a change in a distance between the source resonator 116 and the target resonator 121, a change in a resonance impedance, impedance mismatching, and the like. According to Equation 1 through Equation 3, when the resonance bandwidth between the source resonator 116 and the target resonator 121, or the bandwidth of impedance-matching frequency remains unbalanced, the Q-factor of the source resonator 116 and the Q-factor of the target resonator 121 may remain unbalanced.

Figure 2:
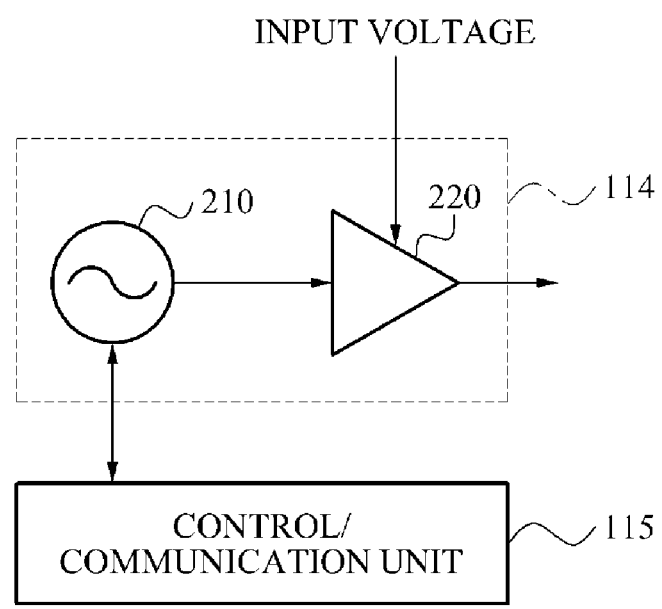
FIG. 2 is a diagram illustrating one configuration of a power converter illustrated in FIG. 1.

FIG. 2 illustrates one configuration of the power converter 114 illustrated in FIG. 1.

Referring to FIG. 2, the power converter 114 includes a switching pulse signal generation unit 210, and a power amplifier 220.

The switching pulse signal generator 210 may generate a switching pulse signal, for example, in a band of a few MHz to tens of MHz. The frequency of the generated switching pulse signal may be determined according to the control of the control/communication unit 115. For example, when a reference resonance frequency $F_{Ref}$ of the source resonator 116 corresponds to 13.56 MHz or 5.78 MHz, the control/communication unit 115 may control the switching pulse signal generator 210 to generate a switching pulse signal having a frequency corresponding to 13.56 MHz or 5.78 MHz. The switching pulse signal generator 210 may include one or more capacitors, and a switch. The switching pulse signal generator 210 may adjust the frequency of the switching pulse signal by switching the one or more capacitors.

The power amplifier 220 may generate an AC power using a switching pulse signal output from a resonance frequency generator. For example, the power amplifier 220 may generate a communication power used for communication or a charging power used for charging, by switching an input voltage of the power amplifier 220 of FIG. 2 based on the switching pulse signal.

The control/communication unit 115 may adjust a signal level of the input voltage of the power amplifier 220 based on a number of the plurality of target devices. Additionally, the control/communication unit 115 may adjust the reference resonance frequency $F_{Ref}$ based on a reflected wave of the charging power, an amount of power received by each of the plurality of target devices, an amount of the charging power, or a transmission efficiency of the charging power.

Figure 3:
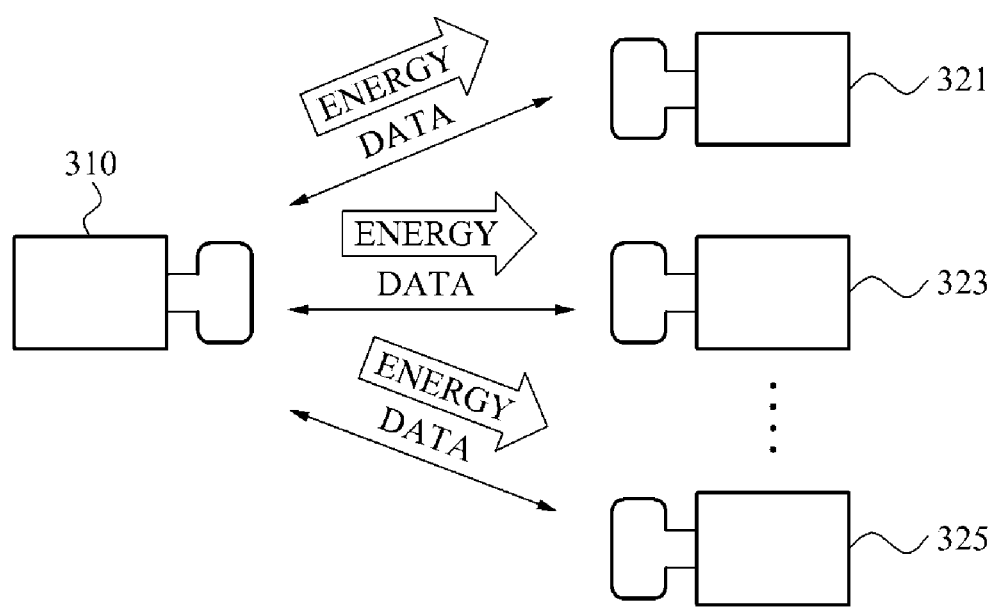
FIG. 3 is a diagram illustrating an operation environment of a wireless power transmission and charging system.

FIG. 3 illustrates an operation environment of a wireless power transmission and charging system.

Referring to FIG. 3, a source device 310 may wirelessly transmit energy to a plurality of target devices 321, 323, and 325 simultaneously. According to a resonance-based wireless power transmission scheme, the single source device 310 may simultaneously charge the plurality of target devices 321, 323, and 325.

According to the resonance-based wireless power transmission scheme, the source device 310 and the plurality of target devices 321, 323, and 325 may transmit and receive data via an in-band communication, or an out-band communication.

In an in-band communication scheme, power and a signal may be transmitted within a coupling area between a source resonator and a target resonator. Unlike an out-band communication scheme, the in-band communication scheme may cause a small amount of interference in peripheral devices, in certain instances. The out-band communication may use a communication channel, such as a ZigBee channel, Wi-Fi channel, Wi-Max channel, a Bluetooth channel, and/or the like. In the in-band communication, data may be transmitted using a power transmitting channel.

Figure 4:
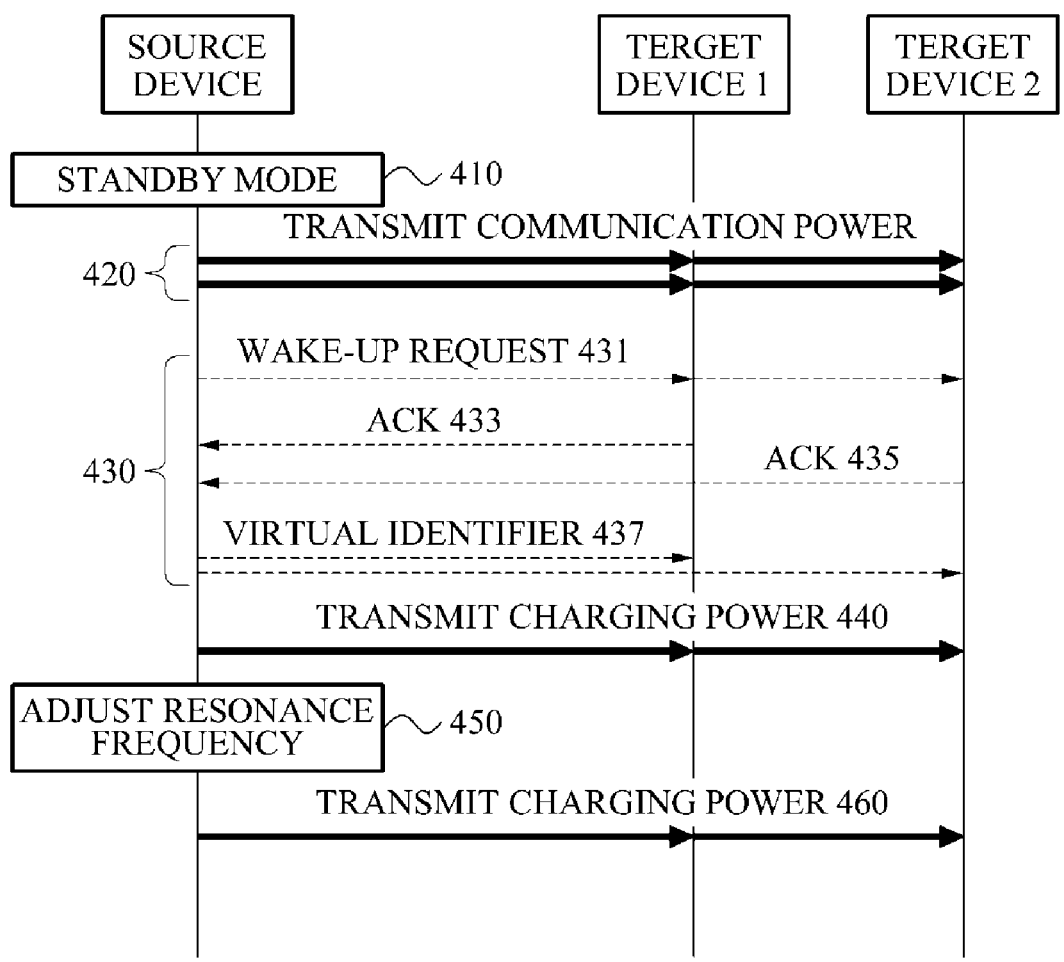
FIG. 4 is a diagram illustrating a resonance frequency control method.

FIG. 4 illustrates a resonance frequency control method.

As illustrated in FIG. 4, a source device, a target device 1, and a target device 2 may transmit and receive data via an in-band communication. Also, the source device, the target device 1, and the target device 2 may transmit and receive data via an out-band communication.

Referring to FIG. 4, in operation 410, the source device is operated in a standby mode when a target is not detected. When the target device 1 and the target device 2 are detected in the standby mode, the source device may generate communication power used in the target device. The source device may generate the communication power used in a plurality of target devices by converting DC voltage supplied to the power amplifier 220 of FIG. 2 to AC voltage using a reference resonance frequency $F_{Ref}$. For instance, the source device may transmit a test signal at predetermined periods, or may detect the target device 1 or the target device 2 using a pressure sensor. When the target device 1 is disposed on the source device, the source device may detect the target device 1 using the pressure sensor included in the source device. Also, the source device may be switched from the standby mode to an access mode by a predetermined control signal. The access mode may refer to a mode in which operations in 420 and 430 of FIG. 4 may be performed.

In operation 420, the source device transmits the communication power to the target device 1 or the target device 2, for instance, using a magnetic coupling. The source device may generate the communication power used in the target device, by converting DC voltage to be supplied to the power amplifier 220 to AC voltage using a reference resonance frequency $F_{Ref}$. The communication power may refer to energy used for activating a communication module and a processor of the target device. The communication power may be transmitted during a predetermined time in a form of a constant wave (CW). The target device 1 and the target device 2 may receive power requested for operating the communication module and the processor, by receiving the communication power.

In operation 430, the source device wakes up the target device, or assigns a virtual identifier to the target device. Similarly, the target device may receive a wake-up request message from the source device, and may be assigned the virtual identifier. For instance, the target device 1 and the target device 1 and the target device 2 may activate a communication and control function by receiving the wake-up request message, and may be assigned the virtual identifier from the source device.

Operation 430 includes operation 431 in which the source device transmits a wake-up request message to the target device 1 and the target device 2, operation 433 in which the source device receives an acknowledge (ACK) message from the target device 1, and operation 435 in which the source device receives an ACK message from the target device 2. In operation 431, the source device may transmit a wake-up request message to a plurality of target devices. In operations 433 and 435, the source device may receive response messages corresponding to the wake-up request message from each of the plurality of target devices. The source device may detect a number of the plurality of target devices based on the received response messages. In some instances, a response message and an ACK message may refer to the same message.

For example, the ACK messages may include identifier information of each of the target device 1 and the target device 2. The identifier information included in the ACK message may correspond to an intrinsic identifier of each of the target device 1 and the target device 2. Also, one or more of the response messages corresponding to the wake-up request message may include a product type of a corresponding target device, manufacturer information of the corresponding target device, a product model name of the corresponding target device, a battery type of the corresponding target device, a charging scheme of the corresponding target device, an impedance value of a load of the corresponding target device, to information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

Operation 430 further includes operation 437 in which a virtual identifier is assigned. The virtual identifier may be used instead of the intrinsic identifier of each of the target device 1 and the target device 2. The virtual identifier may correspond to a temporary identifier that may be used for charging. For example, the virtual identifier may be assigned using numbers from 1 to 8 based on a sequence of access. Unlike the intrinsic identifier, the virtual identifier may be used for classifying the target device in operations 440 through 460. The intrinsic identifier may corresponds to long data of a byte scale, including a product model name, a serial number of product, manufacturer information, and the like, whereas the virtual identifier may correspond to short data corresponding to 3 to 4 bits.

In operation 440, the source device generates charging power, and transmits the charging power to the plurality of target devices using the magnetic coupling. For example, in operation 440, the source device may generate the charging power by adjusting a signal level of the DC voltage to be supplied to the power amplifier 220, that is, to be input to the power amplifier 220 based on the number of the plurality of target devices. In operation 440, the source device may transmit the charging power to the target device 1 and the target device 2. The DC voltage to be supplied to the power amplifier 220 may refer to the input voltage of the power amplifier 220 of FIG. 2. The charging power may be constantly transmitted during a predetermined time, and may be transmitted at a higher power level in comparison to the communication power. For example, the power level of the communication power may be 0.1 to 1 Watt, and the power level of the charging power may be 1 to 20 Watt.

In operation 440, the control/communication unit 115 of the source device may determine a signal level of the DC voltage to be input to the power amplifier 220, based on the product type of the corresponding target device, the manufacturer information of the corresponding target device, the product model name of the corresponding target device, the battery type of the corresponding target device, the charging scheme of the corresponding target device, the impedance value of the load of the corresponding target device, the information about the characteristic of the target resonator of the corresponding target device, the information about the used frequency band of the corresponding target device, or the amount of the power to be used for the corresponding target device. For example, the source device may determine the level of the DC voltage input to the power amplifier 220 to be a predetermined value, based on a battery type of the target device 1 and a battery type of the target device 2. The source device may refer to a look-up table mapped to information of a target device, and may determine the level of the DC voltage input to the power amplifier 220 to be the predetermined value, for instance.

In operation 450, the source device adjusts the reference resonance frequency $F_{Ref}$ based on a reflected wave of the charging power and a transmission efficiency of the charging power. Operation 450 performed by the source device may include operations 551 through 557 illustrated in FIG. 5, for instance.

In operation 460, the source device transmits the charging power using the adjusted resonance frequency.

In FIG. 4, the charging power in operation 440 may be referred to as a first charging power, and the charging power in operation 460 may be referred to as a second charging power. Accordingly, a power receiving method of a wireless power receiver may include receiving the first charging power from a wireless power transmitter, and receiving the second charging power generated using an adjusted resonance frequency after the reference resonance frequency $F_{Ref}$ is adjusted in the wireless power transmitter. Also, the reference resonance frequency $F_{Ref}$ may be adjusted based on a reflected wave of the first charging power, an amount of the first charging power, or a transmission efficiency of the first charging power. In operation 450, the wireless power receiver may continuously perform a) receiving the second charging power, b) receiving, from the wireless power transmitter, a command to request an input voltage value and an input current value of a target device, or a command to request a DC/DC output voltage value and a DC/DC output current value of the target device, and c) transmitting, to the wireless power transmitter, an input voltage value and an input current value of a rectification unit, or the DC/DC output voltage value and the DC/DC output current value.

Figure 5:
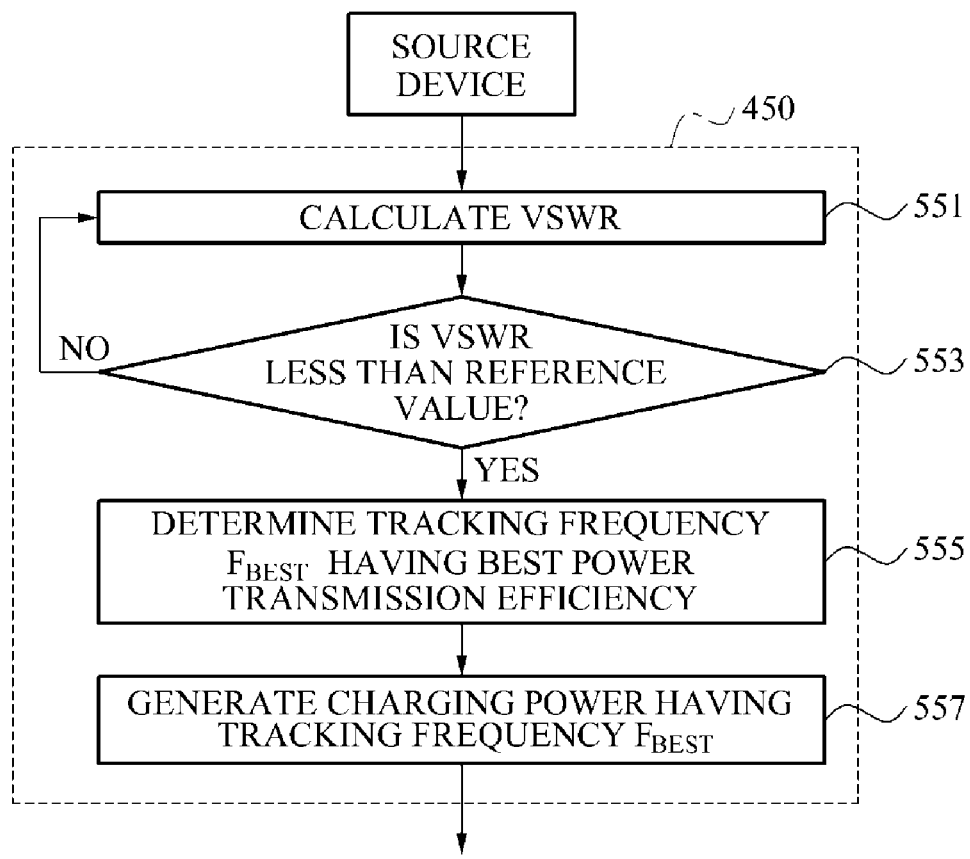
FIG. 5 is a diagram illustrating an operation of adjusting a resonance frequency illustrated in FIG. 4.

FIG. 5 illustrates an operation of adjusting a resonance frequency illustrated in FIG. 4.

Referring to FIG. 5, in operation 551, a source device calculates a VSWR based on a voltage level of a reflected wave, and a level of an output voltage and a level of an output current of a source resonator.

In operation 553, the source device determines whether the calculated VSWR is less than a predetermined value. When the VSWR is less than the predetermined value, the source device determines a tracking frequency $F_{Best}$ having the best or highest power transmission efficiency, among N predetermined tracking frequencies, in operation 555. In operation 555, the tracking frequency $F_{Best}$ may be determined by continuously performing operations 610 through 660 of FIG. 6. A process of determining the tracking frequency $F_{Best}$ among the N predetermined tracking frequencies may be performed by continuously performing the operations 610 through 660, in some instances.

In operation 557, the source device generates a charging power used for charging, using the tracking frequency $F_{Best}$. The source device may change a frequency of a switching pulse signal from a reference resonance frequency $F_{Ref}$ to the tracking frequency $F_{Best}$.

Figure 6:
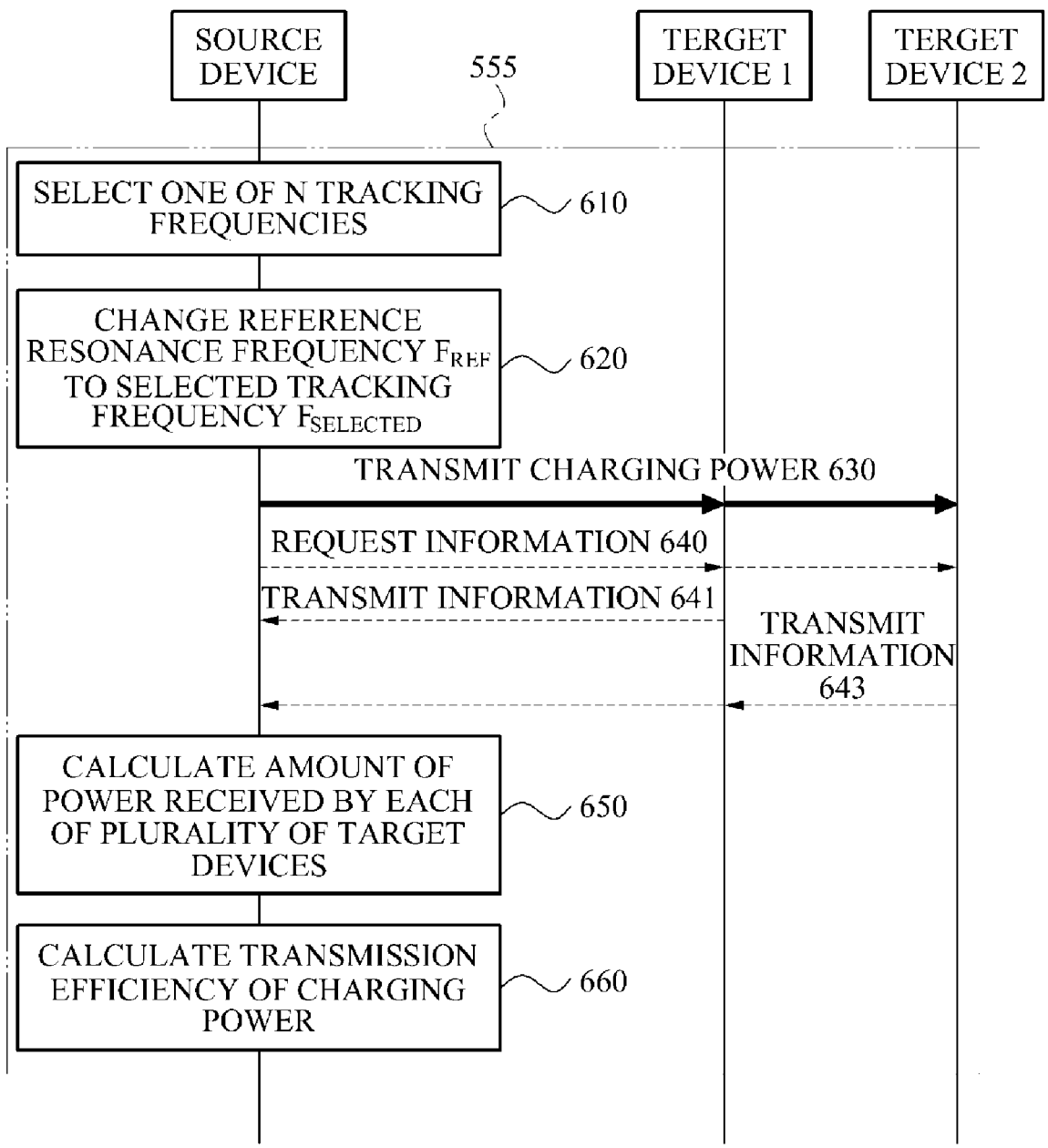
FIG. 6 is a diagram illustrating a method of selecting a tracking frequency having the highest power transmission efficiency illustrated in FIG. 5.

FIG. 6 illustrates a method of selecting the tracking frequency $F_{Best}$ having the best, highest, or most optimal power transmission efficiency illustrated in FIG. 5.

Operations 610 through 660 of FIG. 6 may be performed by the control/communication unit 115 of FIG. 1 or FIG. 2, in some instances.

Referring to FIG. 6, in operation 610, a source device selects one of N tracking frequencies based on a predetermined frequency selection scheme. For example, the predetermined frequency selection method may be one of schemes illustrated in FIGS. 7A through 7C.

In operation 620, the source device changes a reference resonance frequency $F_{Ref}$ to the selected tracking frequency $F_{Selected}$.

In operation 630, the source device transmits a charging power used for charging. In this instance, a frequency of the transmitted charging power may correspond to the selected tracking frequency $F_{Selected}$.

In operation 640, the source device requests information from target devices. For example, the source device may transmit, to the plurality of target devices, a command to request an input voltage value and an input current value of a target device, or a command to request a DC/DC output voltage value and a DC/DC output current value of the target device.

In operations 641 and 643, the source device receives, from each of the plurality of target devices, an input voltage value and an input current value of a rectification unit, or the DC/DC output voltage value and the DC/DC output current value.

In operation 650, the source device calculates an amount of power received by each of the plurality of target devices, based on the input voltage value and the input current value, or the DC/DC output voltage value and the DC/DC output current value. Since power equals current multiplied by voltage, the amount of the received power may be easily calculated.

In operation 660, the source device calculates a transmission efficiency of the charging power, based on a level of an output voltage and a level of an output current of a source resonator, and the amount of the power received by each of the plurality of target devices. The level of the output voltage and the output current of the source resonator may correspond to a level of the input voltage of the power amplifier 220 illustrated in FIG. 2, and a level of a current flowing into the power amplifier 200. Also, the level of the output voltage and the output current of the source resonator may correspond to a level of an output voltage and a level of an output current of the power converter 114 of FIG. 1. The power transmission efficiency may be calculated based on the sum of amounts of the power received by each of the target devices, and a ratio of a level of an output power of the source resonator. The level of the output power of the source resonator may correspond to a value obtained by multiplying a level of an output voltage and a level of an output current of the source resonator.

Figure 7A:
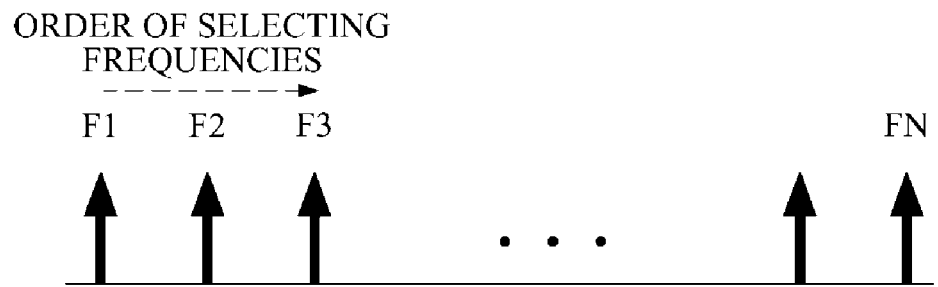
FIGS. 7A through 7C are diagrams illustrating schemes of selecting tracking frequencies.
Figure 7B:
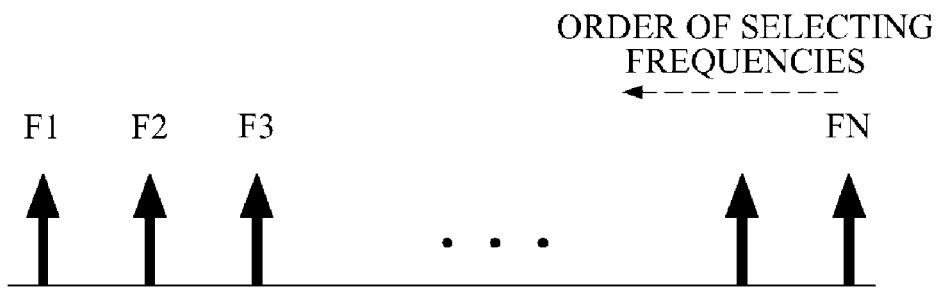
Figure 7C:
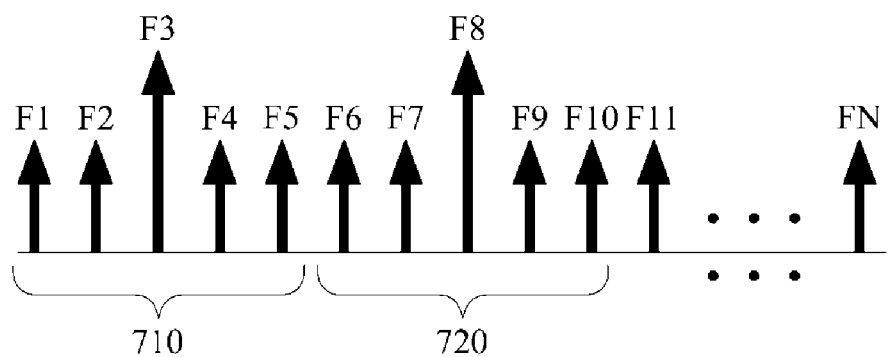

FIGS. 7A through 7C illustrate schemes of selecting tracking frequencies.

FIG. 7A illustrates a scheme of selecting tracking frequencies in a sequential order, starting from a low frequency to a high frequency among N predetermined tracking frequencies.

FIG. 7B illustrates a scheme of selecting tracking frequencies in a sequential order, starting from a high frequency to a low frequency among N predetermined tracking frequencies.

FIG. 7C illustrates a scheme of sequentially selecting M predetermined tracking frequencies from N predetermined tracking frequencies, primarily performing operations 620 through 660 of FIG. 6 continuously for each of the M predetermined tracking frequencies, and secondarily performing the operations 620 through 660 continuously for each tracking frequency, excluding the M predetermined tracking frequencies from the N predetermined tracking frequencies, where M may be less than N. In the scheme illustrated in FIG. 7C, a source device may select F3 and F8, and may perform the operations 620 through 660 continuously for F3 and F8. Then, the source device may perform the operations 620 through 660 continuously for F1, F2, F4, F5, F6, F7, F9, F10, and F11 through FN, excluding F3 and F8.

The source device may employ a scheme of classifying N predetermined tracking frequencies into M groups, for example, a first group 710 and a second group 720, selecting one of the M groups based on a number of a plurality of target devices, and sequentially selecting tracking frequencies included in the selected group, where M may be less than N. For example, when the number of target devices is set to less than 4, the source device may select the first group 710, and may performing the operations 620 through 660 continuously for F1, F2, F3, F4, and F5 included in the first group 710.

In a wireless power transmission and charging system, the loss of transmission power may be reduced by controlling a resonance frequency, without a separate matching circuit.

In a wireless power transmission and charging system, the resonance frequency may be controlled based on the power transmission efficiency.

In one or more embodiments, the source resonator, a repeater resonator, and/or the target resonator may be configured as a helix coil structured resonator, a spiral coil structured resonator, a meta-structured resonator, or the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density occurring with respect to a given electric field in a corresponding material and an electric flux density occurring with respect to the given electric field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area.

FIGS. 8 through FIG. 14 illustrate various resonator structures which may be used in one or more embodiments.

Figure 8:
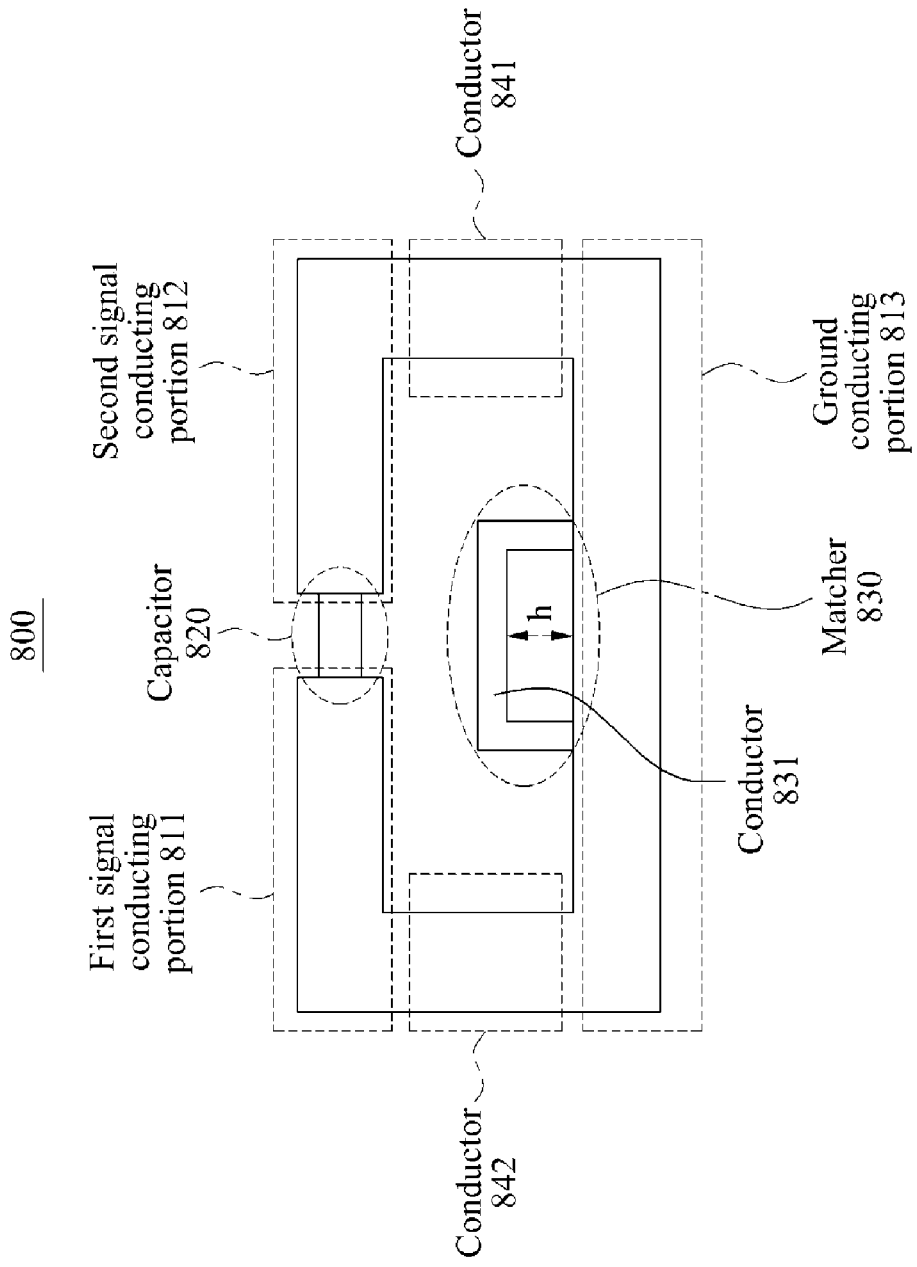
FIGS. 8 through 14 are diagrams illustrating various resonator structures.

FIG. 8 illustrates a resonator 800 having a two-dimensional (2D) structure.

As shown, the resonator 800 having the 2D structure includes a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 so that an electric field may be confined within the capacitor 820. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded.

As shown in FIG. 8, the resonator 800 may be configured to have a generally 2D structure. The transmission line includes the first signal conducting portion 811 and the second signal conducting portion 812 in the upper portion of the transmission line, and includes the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to a conductor 842, and another end of the first signal conducting portion 811 may be connected to the capacitor 820. And one end of the second signal conducting portion 812 may be shorted to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 may have an electrically closed-loop structure. The term "closed-loop structure" as used herein, may include a polygonal structure, for example, a circular structure, a rectangular structure, or the like that is a circuit that is electrically closed.

The capacitor 820 may be inserted into an intermediate portion of the transmission line. For example, the capacitor 820 may be inserted into a space between the first signal conducting portion 811 and the second signal conducting portion 812. The capacitor 820 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may also be referred to as a mu negative (MNG) resonator. Various criteria may be applied to determine the capacitance of the capacitor 820. For example, the various criteria for enabling the resonator 800 to have the characteristic of the metamaterial may include one or more of the following: a criterion for enabling the resonator 800 to have a negative magnetic permeability in a target frequency, a criterion for enabling the resonator 800 to have a zeroth order resonance characteristic in the target frequency, or the like. The resonator 800, also referred to as the MNG resonator 800, may also have a zeroth order resonance characteristic (i.e., having, as a resonance frequency, a frequency when a propagation constant is "0"). If the resonator 800 has the zeroth order resonance characteristic, the resonance frequency may be independent with respect to a physical size of the MNG resonator 800. Moreover, by appropriately designing the capacitor 820, the MNG resonator 800 may sufficiently change the resonance frequency without significantly changing the physical size of the MNG resonator 800.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 for impedance-matching. For example, the matcher 830 may be configured to appropriately determine and adjust the strength of a magnetic field of the MNG resonator 800. Depending on the configuration, current may flow in the MNG resonator 800 via a connector, or may flow out from the MNG resonator 800 via the connector. The connector may be connected to the ground conducting portion 813 or the matcher 830. A physical connection may be formed between the connector and the ground conducting portion 813, or between the connector and the matcher 830. In some instances, the power may be transferred through coupling without using a physical connection between the connector and the ground conducting portion 813 or the matcher 830.

As shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 includes the conductor 831 for the impedance-matching positioned in a location that is separate from the ground conducting portion 813 by a distance h. The impedance of the resonator 800 may be changed by adjusting the distance h.

In some instances, a controller may be provided that is configured to control the matcher 830 which generates and transmits a control signal to the matcher 830 directing the matcher to change its physical shape so that the impedance of the resonator may be adjusted. For example, the distance h between a conductor 831 of the matcher 830 and the ground conducting portion 813 may increase or decrease based on the control signal. As shown in FIG. 8, the matcher 830 may be configured as a passive element such as the conductor 831, for example. Of course, in other embodiments, the matcher 830 may be configured as an active element such as a diode, a transistor, or the like. If the active element is included in the matcher 830, the active element may be driven based on the control signal generated by the controller, and the impedance of the resonator 800 may be adjusted based on the control signal. For example, when the active elements is a diode included in the matcher 830, the impedance of the resonator 800 may be adjusted depending on whether the diode is in an on state or in an off state.

In some instances, a magnetic core may be further provided to pass through the MNG resonator 800. The magnetic core may perform a function of increasing a power transmission distance.

Figure 9:
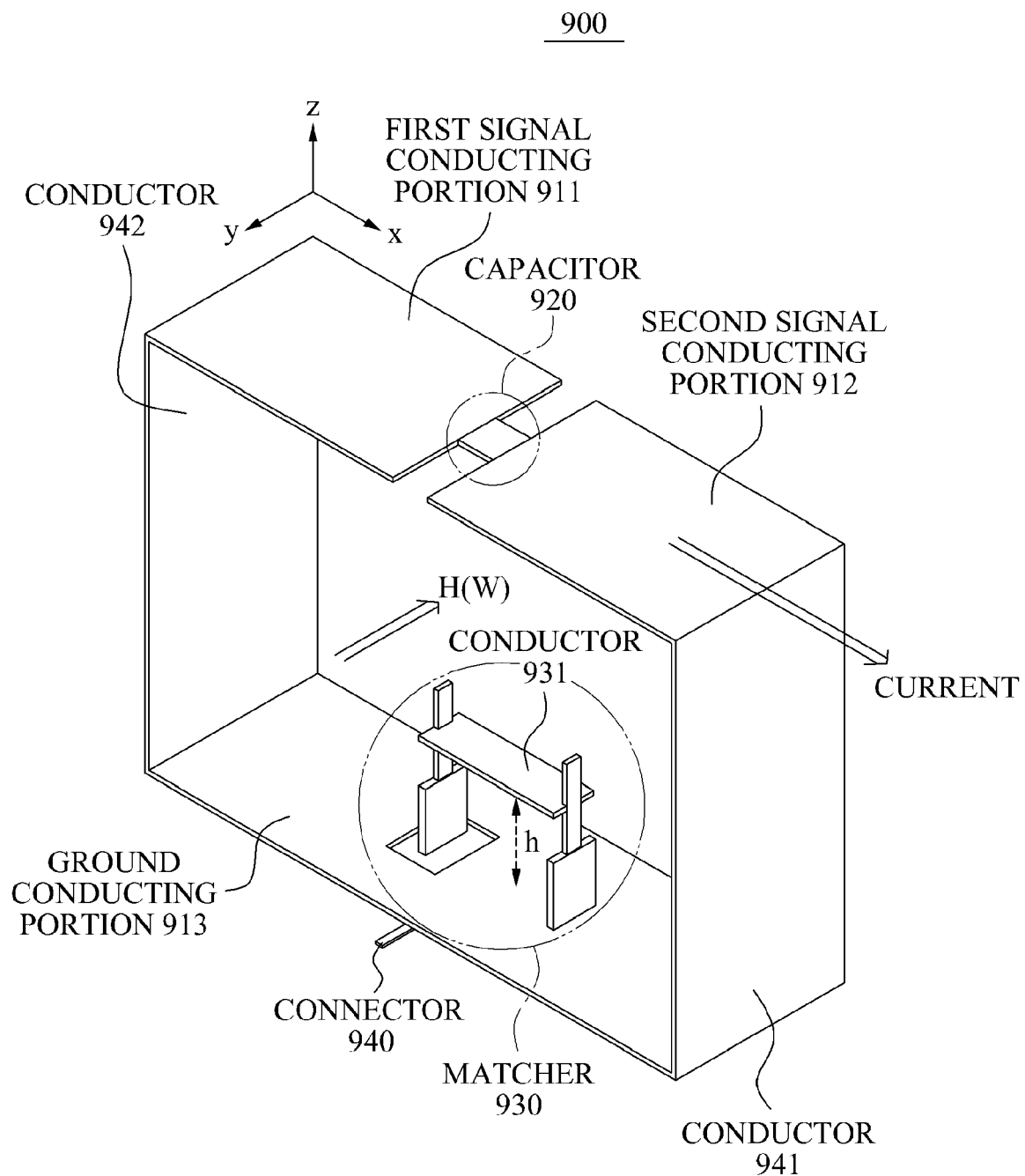

FIG. 9 illustrates an example of a resonator 900 having a three-dimensional (3D) structure.

Referring to FIG. 9, the resonator 900 having the 3D structure includes a transmission line and a capacitor 920. The transmission line includes a first signal conducting portion 911, a second signal conducting portion 912, and a ground conducting portion 913. The capacitor 920 may be inserted, for instance, in series between the first signal conducting portion 911 and the second signal conducting portion 912 of the transmission line such that an electric field may be confined within the capacitor 920.

As shown in FIG. 9, the resonator 900 may have a generally 3D structure. The transmission line includes the first signal conducting portion 911 and the second signal conducting portion 912 in an upper portion of the resonator 900, and includes the ground conducting portion 913 in a lower portion of the resonator 900. The first signal conducting portion 911 and the second signal conducting portion 912 may be disposed to face the ground conducting portion 913. In this arrangement, current may flow in an x direction through the first signal conducting portion 911 and the second signal conducting portion 912. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 911 may be electrically connected (i.e., shorted) to a conductor 942, and another end of the first signal conducting portion 911 may be connected to the capacitor 920. One end of the second signal conducting portion 912 may be shorted to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure. As shown in FIG. 9, the capacitor 920 may be inserted or otherwise positioned into a space between the first signal conducting portion 911 and the second signal conducting portion 912. For example, the capacitor 920 may be inserted into a space between the first signal conducting portion 911 and the second signal conducting portion 912. The capacitor 920 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 920 is inserted into the transmission line, the resonator 900 may have a property of a metamaterial, in some instances, as discussed above. For example, when the capacitor is configured as a lumped element, the resonator 900 may have the characteristic of the metamaterial. When the resonator 900 has a negative magnetic permeability in a predetermined frequency band by appropriately adjusting the capacitance of the capacitor 920, the resonator 900 may also be referred to as an MNG resonator. Various criteria may be applied to determine the capacitance of the capacitor 920. For example, the various criteria may include one or more of the following: a criterion for enabling the resonator 900 to have the characteristic of the metamaterial, a criterion for enabling the resonator 900 to have a negative magnetic permeability in a target frequency, a criterion for enabling the resonator 900 to have a zeroth order resonance characteristic in the target frequency, or the like. Based on at least one criterion among the aforementioned criteria, the capacitance of the capacitor 920 may be determined.

The resonator 900, also referred to as the MNG resonator 900, may have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Thus, by appropriately designing the capacitor 920, the MNG resonator 900 may sufficiently change the resonance frequency without significantly changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. Since the MNG resonator 900 having the zeroth order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant. The MNG resonator 900 may have a relatively high Q-factor using the capacitor 920 of the lumped element and thus, it may be possible to enhance an efficiency of power transmission.

Also, the MNG resonator 900 includes a matcher 930 for impedance-matching. The matcher 930 may be configured to appropriately adjust the strength of magnetic field of the MNG resonator 900. The impedance of the MNG resonator 900 may be determined by the matcher 930. In one or more embodiments, current may flow in the MNG resonator 900 via a connector 940, or may flow out from the MNG resonator 900 via the connector 940. And the connector 940 may be connected to the ground conducting portion 913 or the matcher 930.

As shown in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 includes the conductor 931 for the impedance-matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may increase or decrease based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. For example, one or more conductors may be included in the matcher 930 and the distance h may be adjusted by adaptively activating one of the conductors. Alternatively or additionally, the distance h may be adjusted by adjusting the physical location of the conductor 931 up and down. For instance, the distance h may be controlled based on the control signal of the controller. The controller may generate the control signal using various factors. As shown in FIG. 9, the matcher 930 may be configured as a passive element such as the conductor 931, for instance. Of course, in other embodiments, the matcher 930 may be configured as an active element such as a diode, a transistor, or the like. If the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an ON state or in an OFF state.

In some implementations, a magnetic core may be further provided to pass through the resonator 900 configured as the MNG resonator. The magnetic core may increase the power transmission distance.

Figure 10:
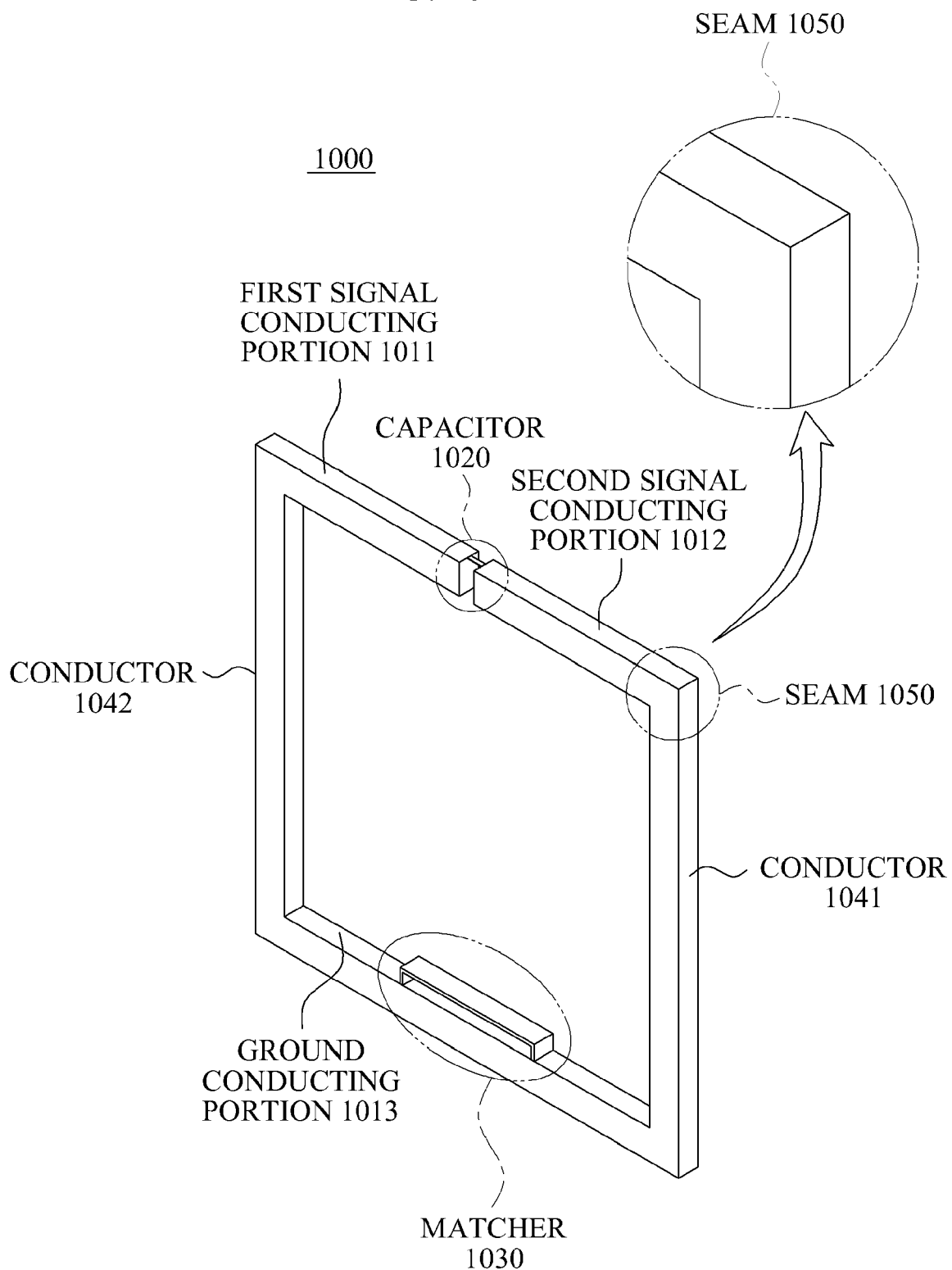

FIG. 10 illustrates a resonator 1000 for a wireless power transmission configured as a bulky type.

As used herein, the term "bulky type" may refer to a seamless connection connecting at least two parts in an integrated form.

Referring to FIG. 10, a first signal conducting portion 1011 and a conductor 1042 may be integrally formed instead of being separately manufactured and thereby be connected to each other. Similarly, the second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. Accordingly, the second signal conducting portion 1012 and the conductor 1041 may be connected to each other without using a separate seam (i.e., seamlessly connected to each other). Accordingly, it may be possible to decrease a conductor loss caused by the seam 1050. Similarly, the second signal conducting portion 1012 and a ground conducting portion 1013 may be seamlessly and integrally manufactured. In addition, the first signal conducting portion 1011 and the ground conducting portion 1013 may be seamlessly and integrally manufactured. And, the first signal conducting portion 1011 and the conductor 1042 may be seamlessly manufactured. Also, the conductor 1042 and the ground conducting portion 1013 may be seamlessly manufactured.

A matcher 1030 may be provided that is similarly constructed as described herein in one or more embodiments.

Figure 11:
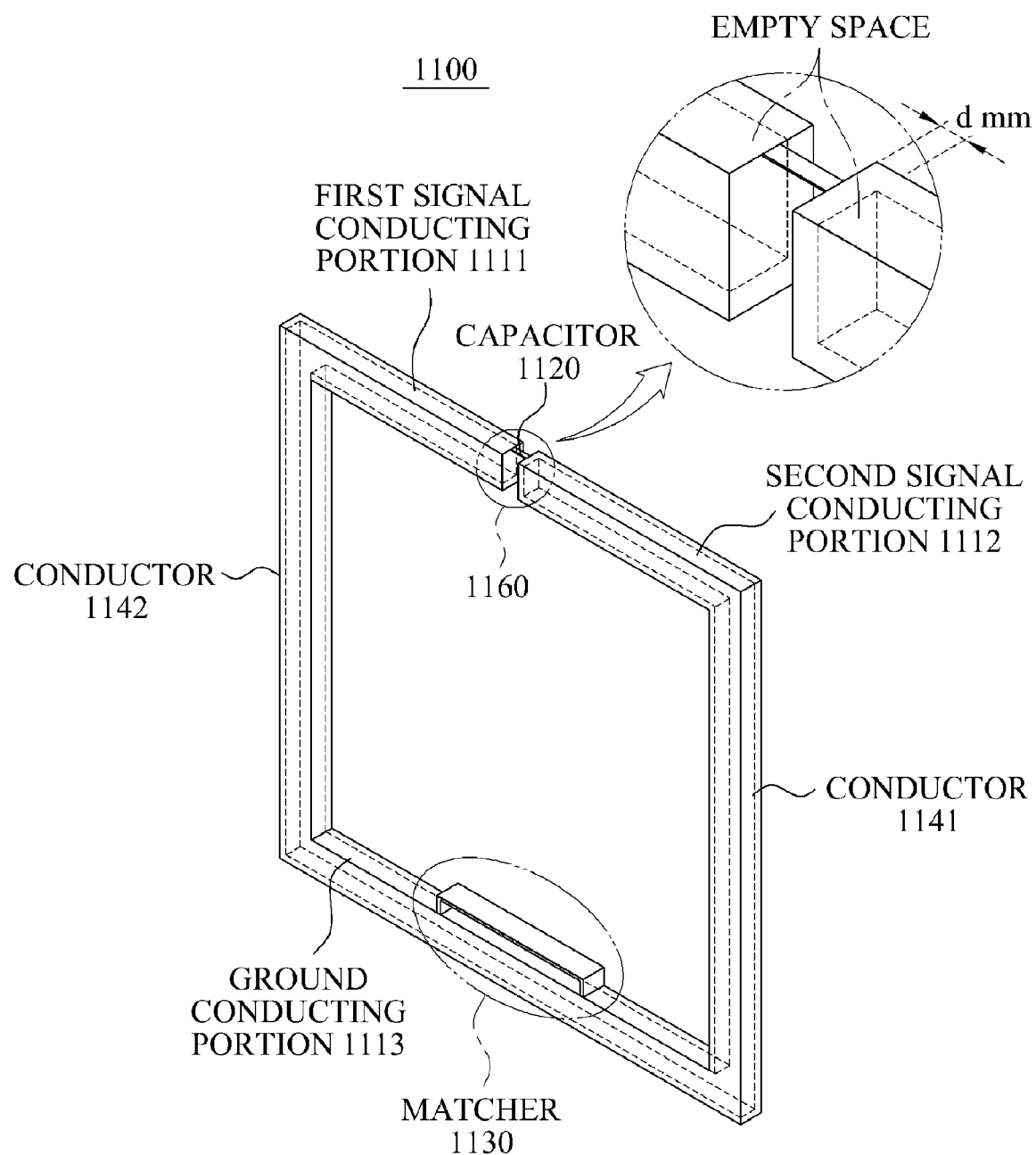

FIG. 11 illustrates a resonator 1100 for a wireless power transmission, configured as a hollow type.

Referring to FIG. 11, each of a first signal conducting portion 1111, a second signal conducting portion 1112, a ground conducting portion 1113, and conductors 1141 and 1142 of the resonator 1100 configured as the hollow type structure. As used herein the term "hollow type" refers to a configuration that includes an empty space inside.

For a given resonance frequency, an active current may be modeled to flow in only a portion of the first signal conducting portion 1111 instead of all of the first signal conducting portion 1111, the second signal conducting portion 1112 instead of all of the second signal conducting portion 1112, the ground conducting portion 1113 instead of all of the ground conducting portion 1113, and the conductors 1141 and 1142 instead of all of the conductors 1141 and 1142. When a depth of each of the first signal conducting portion 1111, the second signal conducting portion 1112, the ground conducting portion 1113, and the conductors 1141 and 1142 is significantly deeper than a corresponding skin depth in the given resonance frequency, it may be ineffective. The significantly deeper depth may, however, increase the weight or manufacturing costs of the resonator 1100, in some instances.

Accordingly, for the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When one or more of the first signal conducting portion 1111, the second signal conducting portion 1112, the ground conducting portion 1113, and the conductors 1141 and 1142 have an appropriate depth deeper than a corresponding skin depth, the resonator 1100 may become lighter, and the manufacturing costs of the resonator 1100 may also decrease.

For example, as shown in FIG. 11, the depth of the second signal conducting portion 1112 (as further illustrated in the enlarged view region 1160 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 1111, the second signal conducting portion 1112, the ground conducting portion 1113, and the conductors 1141 and 1142 are made of a copper and they may have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

A capacitor 1120 and a matcher 1130 may be provided that are similarly constructed as described herein in one or more embodiments.

Figure 12:
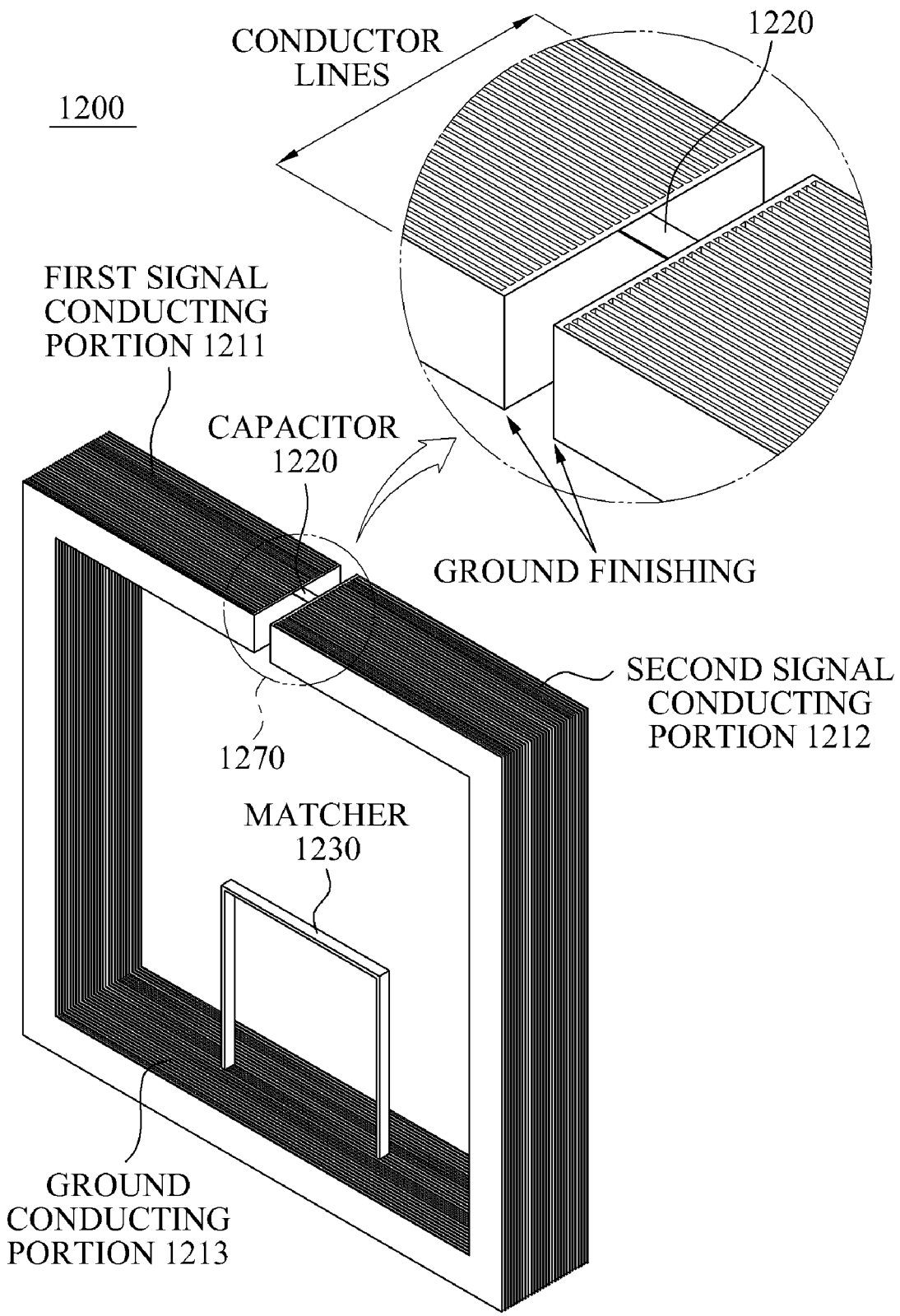

FIG. 12 illustrates a resonator 1200 for a wireless power transmission using a parallel-sheet.

Referring to FIG. 12, the parallel-sheet may be applicable to a first signal conducting portion 1211 and a second signal conducting portion 1212 included in the resonator 1200.

The first signal conducting portion 1211 and/or the second signal conducting portion 1212 may not be perfect conductors and thus, may have an inherent resistance. Due to this resistance, an ohmic loss may occur. The ohmic loss may decrease a Q-factor and also decrease a coupling effect.

By applying the parallel-sheet to each of the first signal conducting portion 1211 and the second signal conducting portion 1212, it may be possible to decrease the ohmic loss, and to increase the Q-factor and the coupling effect. Referring to the enlarged view portion 1270 (indicated by a circle), when the parallel-sheet is applied, each of the first signal conducting portion 1211 and the second signal conducting portion 1212 includes a plurality of conductor lines. The plurality of conductor lines may be disposed in parallel, and may be electrically connected (i.e., shorted) at an end portion of each of the first signal conducting portion 1211 and the second signal conducting portion 1212.

As described above, when the parallel-sheet is applied to one or both of the first signal conducting portion 1211 and the second signal conducting portion 1212, the plurality of conductor lines may be disposed in parallel. Accordingly, the sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments.

Figure 13:
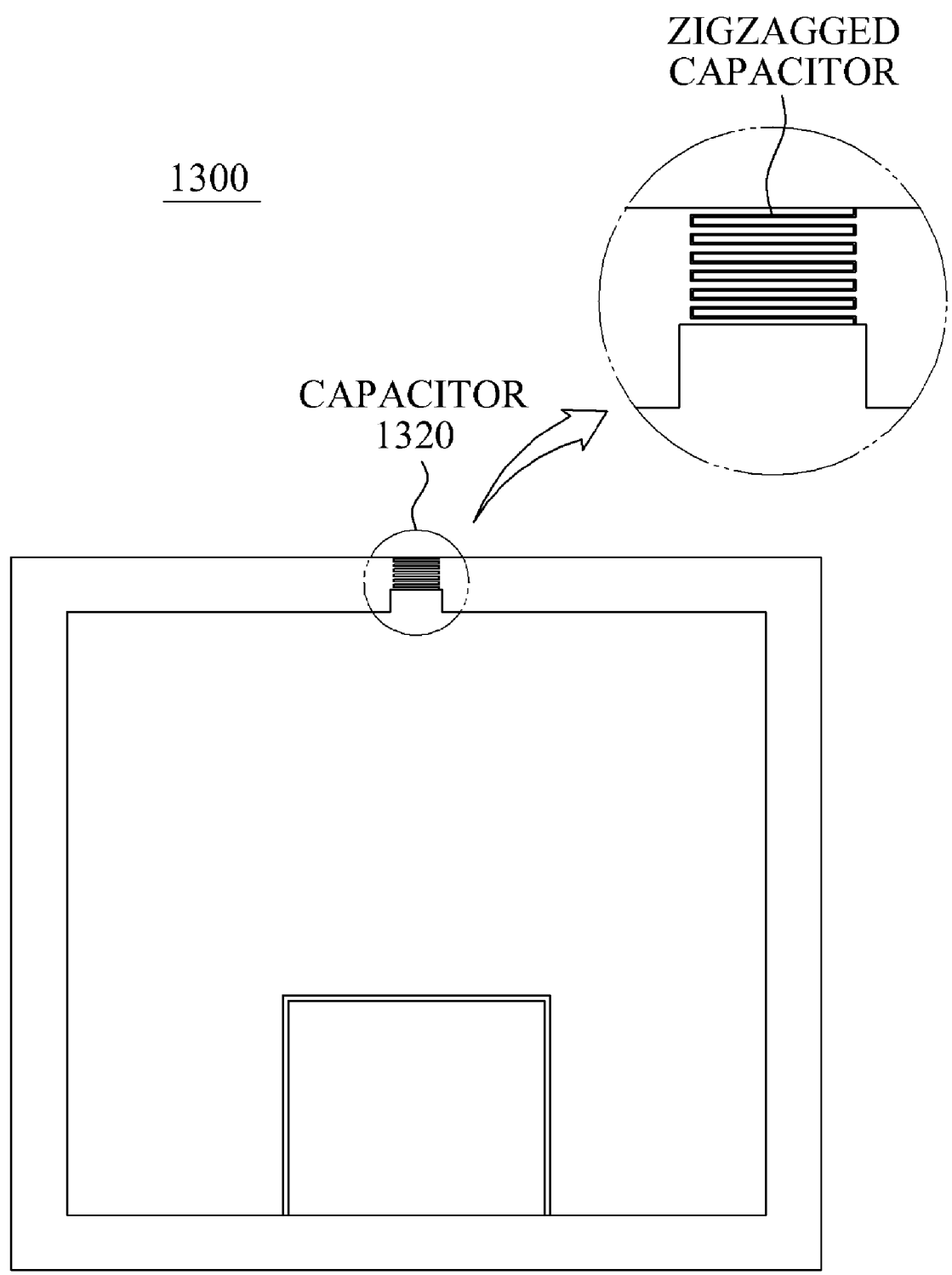

FIG. 13 illustrates a resonator 1300 for a wireless power transmission, including a distributed capacitor.

Referring to FIG. 13, a capacitor 1320 included in the resonator 1300 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1320 as a distributed element, it may be possible to decrease the ESR. As will be appreciated, a loss caused by the ESR may decrease a Q-factor and a coupling effect.

As shown in FIG. 13, the capacitor 1320 may be configured as a conductive line having the zigzagged structure.

By employing the capacitor 1320 as the distributed element, it may be possible to decrease the loss occurring due to the ESR in some instances. In addition, by disposing a plurality of capacitors as lumped elements, it may be possible to decrease the loss occurring due to the ESR. Since a resistance of the capacitors as the lumped elements decreases through a parallel connection, active resistances of parallel-connected capacitors as the lumped elements may also decrease such that the loss occurring due to the ESR may decrease. For example, by employing ten capacitors of 1 pF each instead of using a single capacitor of 10 pF, it may be possible to decrease the loss occurring due to the ESR.

Figure 14A:
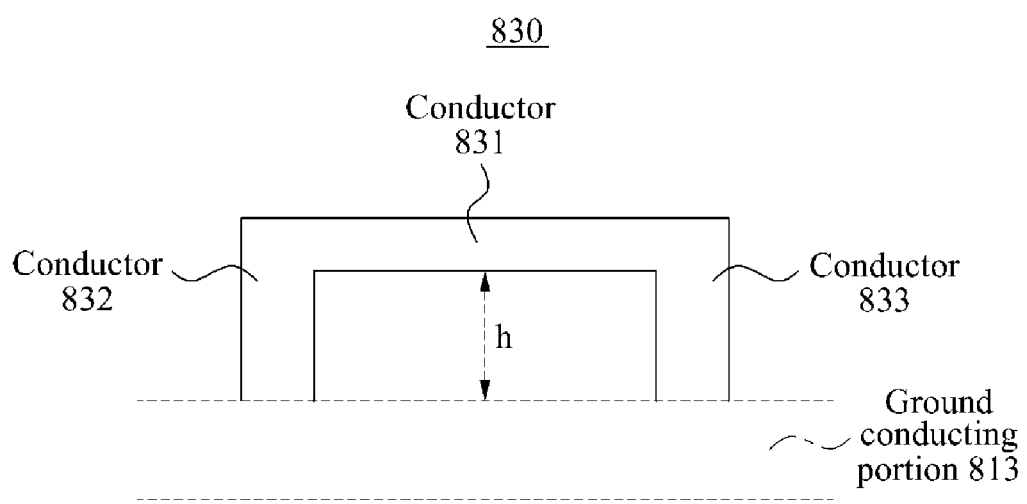
Figure 14B:
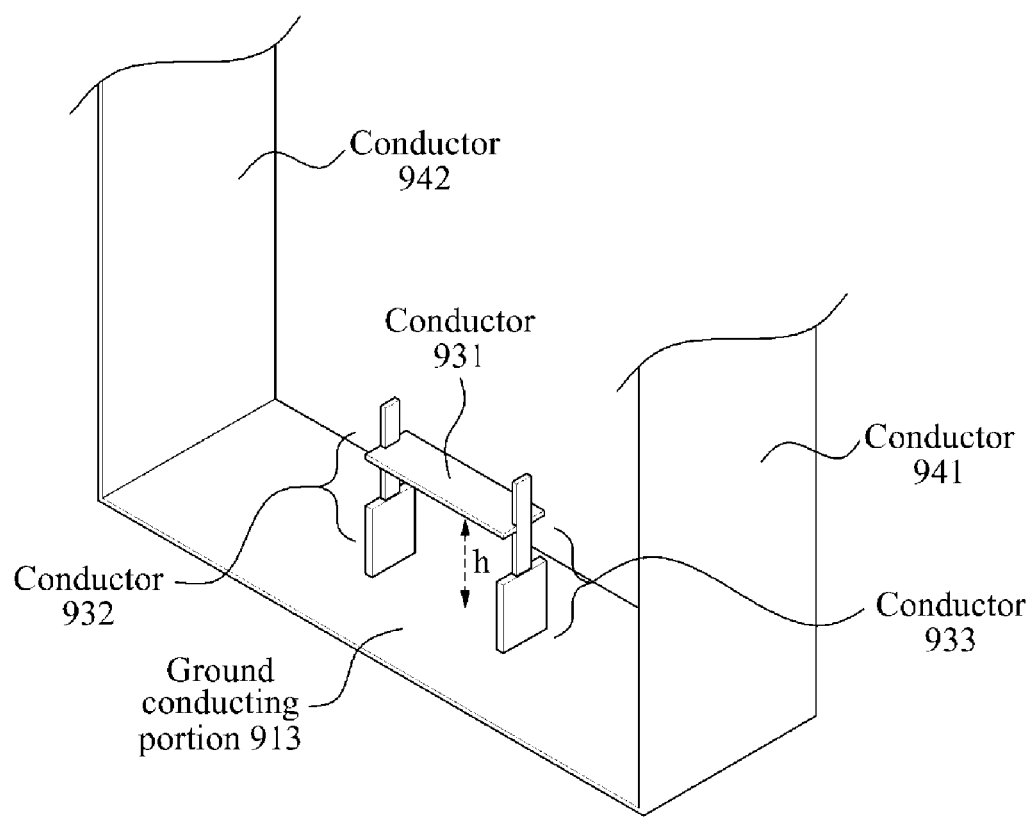

FIG. 14A illustrates one embodiment of the matcher 830 used in the resonator 800 provided in the 2D structure of FIG. 8, and FIG. 14B illustrates an example of the matcher 930 used in the resonator 900 provided in the 3D structure of FIG. 9.

FIG. 14A illustrates a portion of the 2D resonator including the matcher 830, and FIG. 14B illustrates a portion of the 3D resonator of FIG. 9 including the matcher 930.

Referring to FIG. 14A, the matcher 830 includes the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 may be adjusted using a variety of schemes. For example, the variety of schemes may include one or more of the following: a scheme of adjusting the distance h by adaptively activating one of the conductors 831, 832, and 833, a scheme of adjusting the physical location of the conductor 831 up and down, and/or the like.

Referring to FIG. 14B, the matcher 930 includes the conductor 931, a conductor 932, a conductor 933 and conductors 941 and 942. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 included in the 2D structured resonator, in the matcher 930 included in the 3D structured resonator, the distance h between the conductor 931 and the ground conducting portion 913 may be adjusted using a variety of schemes. For example, the variety of schemes may include one or more of the following: a scheme of adjusting the distance h by adaptively activating one of the conductors 931, 932, and 933, a scheme of adjusting the physical location of the conductor 931 up and down, and the like.

In some implementations, the matcher may include an active element. Thus, a scheme of adjusting an impedance of a resonator using the active element may be similar as described above. For example, the impedance of the resonator may be adjusted by changing a path of current flowing through the matcher using the active element.

Figure 15:
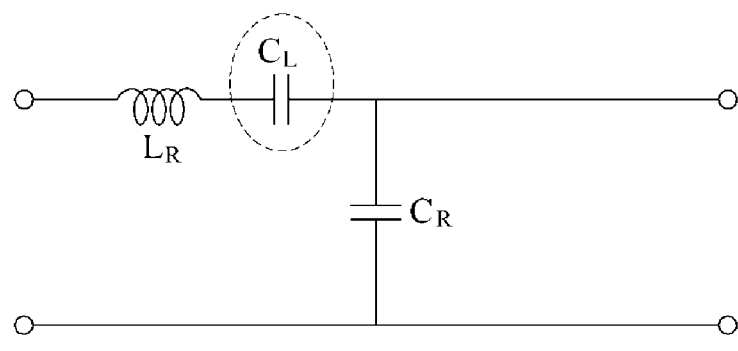
FIG. 15 is a diagram illustrating one equivalent circuit of the resonator illustrated in FIG. 8.

FIG. 15 illustrates one equivalent circuit of the resonator 800 for the wireless power transmission of FIG. 8.

The resonator 800 of FIG. 8 used in wireless power transmission may be modeled to the equivalent circuit of FIG. 15. In the equivalent circuit depicted in FIG. 15, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 4.

$$\omega_{MZR} = \frac{1}{\sqrt{L_R C_L}} \quad \text{[Equation 4]}$$

In Equation 4, MZR denotes a Mu zero resonator.

Referring to Equation 4, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

Figure 16:
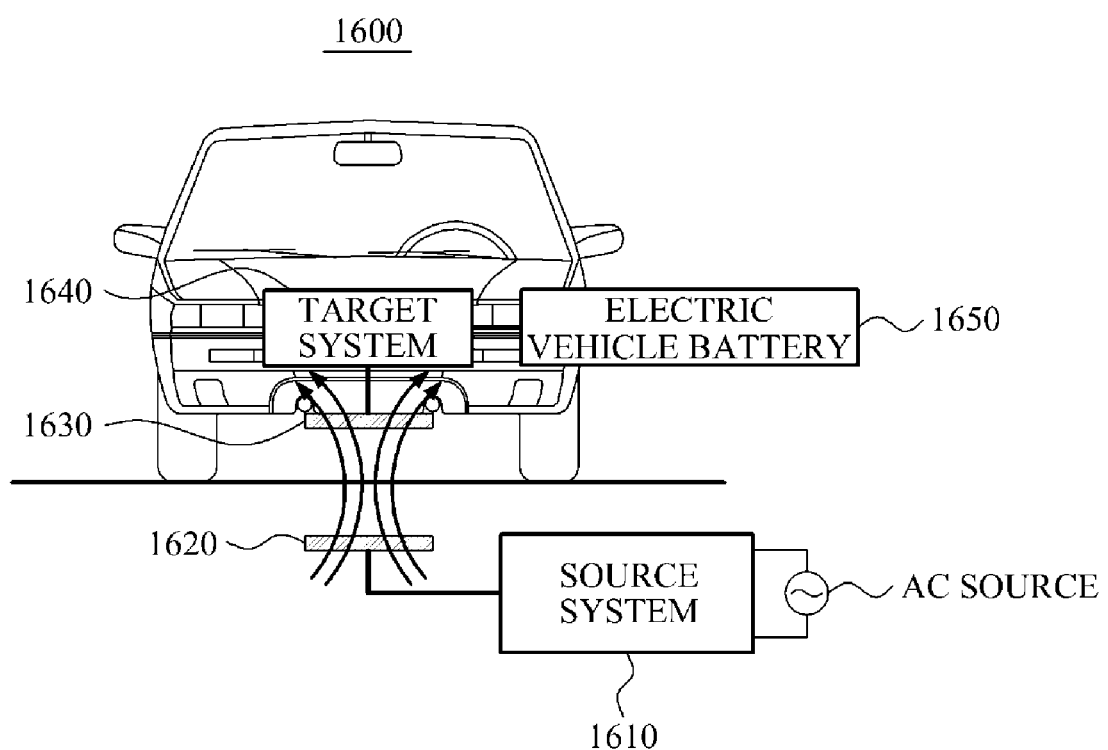
FIG. 16 is a diagram illustrating an electric vehicle charging system.

FIG. 16 illustrates an electric vehicle charging system.

Referring to FIG. 16, an electric vehicle charging system 1600 includes a source system 1610, a source resonator 1620, a target resonator 1630, a target system 1640, and an electric vehicle battery 1650.

The electric vehicle charging system 1600 may have a similar structure to the wireless power transmission system of FIG. 1. The source system 1610 and the source resonator 1620 in the electric vehicle charging system 1600 may function as a source. Additionally, the target resonator 1630 and the target system 1640 in the electric vehicle charging system 1600 may function as a target.

The source system 1610 may include a variable SMPS, a power amplifier, a matching network, a controller, and a communication unit, similarly to the source 110 of FIG. 1. The target system 1640 may include a matching network, a rectification unit, a DC/DC converter, a communication unit, and a controller, similarly to the target 120 of FIG. 1.

The electric vehicle battery 1650 may be charged by the target system 1640.

The electric vehicle charging system 1600 may use a resonant frequency in a band of a few kilohertz (KHz) to tens of MHz.

The source system 1610 may generate power, based on a type of charging vehicle, a capacity of a battery, and a charging state of a battery, and may supply the generated power to the target system 1640.

The source system 1610 may control the source resonator 1620 and the target resonator 1630 to be aligned. For example, when the source resonator 1620 and the target resonator 1630 are not aligned, the controller of the source system 1610 may transmit a message to the target system 1640, and may control alignment between the source resonator 1620 and the target resonator 1630.

For example, when the target resonator 1630 is not located in a position enabling maximum magnetic resonance, the source resonator 1620 and the target resonator 1630 may not be aligned. When a vehicle does not stop accurately, the source system 1610 may induce a position of the vehicle to be adjusted, and may control the source resonator 1620 and the target resonator 1630 to be aligned.

The source system 1610 and the target system 1640 may transmit or receive an ID of a vehicle, or may exchange various messages, through communication.

The descriptions of FIGS. 2 through 15 may be applied to the electric vehicle charging system 1600. However, the electric vehicle charging system 1600 may use a resonant frequency in a band of a few KHz to tens of MHz, and may transmit power that is equal to or higher than tens of watts to charge the electric vehicle battery 1650.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance frequency control method of a wireless power transmitter, the method comprising:
    generating communication power used for communication in a plurality of target devices;
    transmitting communication power to the plurality of target devices;
    detecting a number of the plurality of target devices based on response messages corresponding to the wake-up request message;
    transmitting charging power to the plurality of target devices based on the number of the plurality of target devices; and
    adjusting a resonance frequency based on an amount of power received by one or more of the target devices, an amount of the charging power, a transmission efficiency of the charging power, or any combination thereof.

2. The method of claim 1, wherein generating the communication power comprises converting direct current (DC) voltage supplied to a power amplifier to alternating current (AC) voltage using the resonance frequency having a reference value.

3. The method of claim 1, further comprising:
    transmitting the wake-up request message to the plurality of target devices;
    receiving, from one or more of the plurality of target devices, the response messages corresponding to the wake-up request message; and
    detecting the number of the plurality of target devices based on the response messages.

4. The method of claim 2, further comprising:
    generating the charging power by adjusting a signal level of the DC voltage supplied to the power amplifier based on the number of target devices.

5. The method of claim 1, wherein one or more of the response messages corresponding to the wake-up request message comprises a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

6. The method of claim 4, wherein the generating of the charging power comprises:
    determining the signal level of the DC voltage supplied to the power amplifier based on the product type of the corresponding target device, the manufacturer information of the corresponding target device, the product model name of the corresponding target device, the battery type of the corresponding target device, the charging scheme of the corresponding target device, the impedance value of the load of the corresponding target device, the information about the characteristic of the target resonator of the corresponding target device, the information about the used frequency band of the corresponding target device, the amount of the power to be used for the corresponding target device, the intrinsic identifier of the corresponding target device, the product version information or standards information of the corresponding target device, or any combination thereof.

7. The method of claim 1, wherein the adjusting of the resonance frequency comprises:
   calculating a voltage standing wave ratio (VSWR) based on the voltage level of the reflected wave, and the level of an output voltage and a level of an output current of a source resonator;
   determining a tracking frequency having the highest power transmission efficiency among N predetermined tracking frequencies when the VSWR is less than a predetermined reference value; and
   generating charging power using the tracking frequency having the highest power transmission efficiency.

8. The method of claim 7, wherein the determining of the tracking frequency having the highest power transmission efficiency comprises:
   performing the following operations a) through g) for one or more of the N predetermined tracking frequencies,
   a) selecting one of the N predetermined tracking frequencies based on a predetermined frequency selection scheme;
   b) changing the resonance frequency to the selected tracking frequency;
   c) transmitting the charging power;
   d) transmitting, to the plurality of target devices, a command to request an input voltage value and an input current value of a target device, or a command to request a DC/DC output voltage value and a DC/DC output current value of the target device;
   e) receiving, from each of the plurality of target devices, an input voltage value and an input current value of a rectification unit, or the DC/DC output voltage value and the DC/DC output current value;
   f) calculating an amount of power received by each of the plurality of target devices based on the input voltage value and the input current value, or the DC/DC output voltage value and the DC/DC output current value; and
   g) calculating the transmission efficiency of the charging power based on an output voltage level and an output current level of the source resonator, and the amount of the power received by each of the plurality of target devices.

9. The method of claim 8, wherein the predetermined frequency selection scheme in the operation a) corresponds to a scheme of selecting frequencies in a sequential order, starting from a low frequency to a high frequency among the N predetermined tracking frequencies, or a scheme of selecting frequencies in a sequential order, starting from a high frequency to a low frequency among the N predetermined tracking frequencies.

10. The method of claim 8, wherein the predetermined frequency selection scheme in the operation a) corresponds to a scheme of sequentially selecting M predetermined tracking frequencies from the N predetermined tracking frequencies, primarily performing the operations b) through g) continuously for one or more of the M predetermined tracking frequencies, and secondarily performing the operations b) through g) continuously for each tracking frequency, excluding the M predetermined tracking frequencies from the N predetermined tracking frequencies, M being less than N.

11. The method of claim 8, wherein the predetermined frequency selection scheme in the operation a) corresponds to a scheme of classifying the N predetermined tracking frequencies into M groups, selecting one of the M groups based on the number of the plurality of target devices, and sequentially selecting tracking frequencies included in the selected group, M being less than N.

12. A wireless power transmitter comprising:
   a power converter configured to generate communication power used for communication, charging power used for charging in a plurality of target devices, or both;
   a source resonator configured to transmit, to the plurality of target devices, the communication power, the charging power, or both; and
   a control/communication unit configured to adjust a resonance frequency based on an amount of power received by one or more of the plurality of target devices, an amount of the charging power, a transmission efficiency of the charging power, or any combination thereof,
   wherein the control/communication unit is further configured to detect a number of the plurality of target devices based on response messages corresponding to a wake-up request message, and
   wherein the power converter is further configured to generate the charging power based on the number of the plurality of target devices.

13. The wireless power transmitter of claim 12, wherein the power converter is configured to generate the communication power, the charging power, or both by converting direct current (DC) voltage supplied to a power amplifier to alternating current (AC) voltage using the reference resonance frequency having a reference value.

14. The wireless power transmitter of claim 13, wherein the control/communication unit is configured to adjust the signal level of the DC voltage supplied to the power amplifier based on the number of the plurality of target devices.

15. The wireless power transmitter of claim 14, wherein the control/communication unit is configured to determine the signal level of the DC voltage to be supplied to the power amplifier, based on a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of power to be used for the corresponding target device, an intrinsic identifier of the corresponding target device, product version information or standards information of the corresponding target device, or any combination thereof.

16. The wireless power transmitter of claim 12, wherein the control/communication unit is configured to calculate a voltage standing wave ratio (VSWR) based on a voltage level of the reflected wave, and a level of an output voltage and a level of an output current of the source resonator, to calculate a power transmission efficiency for one or more of N predetermined tracking frequencies when the VSWR is less than a predetermined value, to determine a tracking frequency having the highest power transmission efficiency, among the N predetermined tracking frequencies, and to change the resonance frequency to the tracking frequency having the highest power transmission efficiency.

17. The wireless power transmitter of claim 16, wherein the control/communication unit is configured to perform the following operations a) through g) for one or more of the N predetermined tracking frequencies in order to determine the tracking frequency having the highest power transmission efficiency,
   a) selecting one of the N predetermined tracking frequencies based on a predetermined frequency selection scheme;
   b) changing the resonance frequency to the selected tracking frequency;

c) transmitting the charging power;

d) transmitting, to the plurality of target devices, a command to request an input voltage value and an input current value of a target device, or a command to request a DC/DC output voltage value and a DC/DC output current value of the target device;

e) receiving, from each of the plurality of target devices, an input voltage value and an input current value of a rectification unit, or the DC/DC output voltage value and the DC/DC output current value;

f) calculating an amount of power received by each of the plurality of target devices, based on the input voltage value and the input current value, or the DC/DC output voltage value and the DC/DC output current value; and g) calculating a transmission efficiency of the charging power, based on an output voltage level and an output current level of the source resonator, and the amount of the power received by each of the plurality of target devices.

18. The wireless power transmitter of claim 17, wherein the predetermined frequency selection scheme in the operation a) corresponds to a scheme of selecting frequencies in a sequential order, starting from a low frequency to a high frequency among the N predetermined tracking frequencies, or a scheme of selecting frequencies in a sequential order, starting from a high frequency to a low frequency among the N predetermined tracking frequencies.

19. The wireless power transmitter of claim 17, wherein the predetermined frequency selection scheme in the operation a) corresponds to a scheme of sequentially selecting M predetermined tracking frequencies from the N predetermined tracking frequencies, primarily performing the operations b) through g) continuously for each of the M predetermined tracking frequencies, and secondarily performing the operations b) through g) continuously for each tracking frequency, excluding the M predetermined tracking frequencies from the N predetermined tracking frequencies, M being less than N.

20. The wireless power transmitter of claim 17, wherein the predetermined frequency selection scheme in the operation a) corresponds to a scheme of classifying the N predetermined tracking frequencies into M groups, selecting one of the M groups based on the number of the plurality of target devices, and sequentially selecting tracking frequencies included in the selected group, M being less than N.

21. A resonance frequency control method of a wireless power transmitter, the method comprising:

adjusting a resonance frequency of the wireless power transmitter based on an amount of power received by one or more of target devices, an amount of the charging power, a transmission efficiency of the charging power, or any combination thereof, wherein the adjusting comprises:

calculating the transmission efficiency based on a level of an output voltage of a source resonator and an output current of the source resonator;

determining a tracking frequency having the highest transmission efficiency among N predetermined tracking frequencies when the transmission efficiency is less than a predetermined reference value; and generating charging power using the tracking frequency having the highest transmission efficiency.

* * * * *